US012375620B2

(12) United States Patent
Shukla et al.

(10) Patent No.: US 12,375,620 B2
(45) Date of Patent: Jul. 29, 2025

(54) REMOVING OBJECTS AT IMAGE CAPTURE TIME

(71) Applicant: Adobe Inc., San Jose, CA (US)

(72) Inventors: Sankalp Shukla, Ghaziabad (IN); Angad Kumar Gupta, Noida (IN); Sourabh Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/660,946

(22) Filed: Apr. 27, 2022

(65) Prior Publication Data

US 2023/0353701 A1    Nov. 2, 2023

(51) Int. Cl.
H04N 5/272    (2006.01)
H04N 5/262    (2006.01)
H04N 23/61    (2023.01)
H04N 23/63    (2023.01)

(52) U.S. Cl.
CPC ........... *H04N 5/272* (2013.01); *H04N 5/2621* (2013.01); *H04N 23/61* (2023.01); *H04N 23/632* (2023.01)

(58) Field of Classification Search
CPC ...... H04N 5/272; H04N 23/61; H04N 23/632; H04N 23/611; H04N 23/617; H04N 23/635; H04N 23/80; H04N 5/2621; G06T 2207/10016; G06T 2207/20084; G06T 2207/20182; G06T 5/005; G06T 5/50; G06T 7/20; G06T 7/246; G06T 5/77; G06T 7/11; G06T 11/00; G06T 2207/20081; G06T 2207/20092; G06T 2207/20221; G06T 2207/30196; G06T 2207/30244; G06T 5/60; G06T 7/174; G06T 7/97; G06F 3/0482; G06F 3/04842; G06F 3/04847; G06F 3/0488; G11B 27/02; H04L 65/1089; H04L 65/40; H04L 67/01; H04L 67/025
See application file for complete search history.

(56) References Cited

U.S. PATENT DOCUMENTS 8,600,106 B1    12/2013    Parenteau et al.
9,575,641 B2    2/2017    Shechtman et al.
10,192,129 B2    1/2019    Price et al.
11,152,032 B2    10/2021    Ding et al.
(Continued)

OTHER PUBLICATIONS

Herling, J.; Broll, W. (Jun. 2014). High-Quality Real-Time Video Inpainting with PixMix. IEEE Explore. https://ieeexplore.ieee.org/stamp/stamp.jsp?arnumber=6714519 (Year: 2014).*
(Continued)

*Primary Examiner* — Antoinette T Spinks
(74) *Attorney, Agent, or Firm* — Keller Preece PLLC

(57) ABSTRACT

The present disclosure relates to systems, non-transitory computer-readable media, and methods for removing objects from an image stream at capture time of a digital image. For example, the disclosed system contemporaneously detects and segments objects from a digital image stream being previewed in a camera viewfinder graphical user interface of a client device. The disclosed system removes selected objects from the image stream and fills a hole left by the removed object with a content aware fill. Moreover, the disclosed system displays the image stream with the removed object and content fill as the image stream is previewed by a user prior to capturing a digital image from the image stream.

20 Claims, 18 Drawing Sheets

(56) References Cited

U.S. PATENT DOCUMENTS

| | | | | |
|---|---|---|---|---|
| 2006/0238617 | A1* | 10/2006 | Tamir | H04N 23/695 |
| | | | | 348/E5.09 |
| 2015/0213636 | A1* | 7/2015 | Herling | G06T 5/005 |
| | | | | 382/218 |
| 2015/0277706 | A1* | 10/2015 | Chan | H04L 65/40 |
| | | | | 715/719 |
| 2015/0278986 | A1* | 10/2015 | Edwin | G06T 11/60 |
| | | | | 345/428 |
| 2018/0268527 | A1* | 9/2018 | Schroers | G06T 5/77 |
| 2019/0130229 | A1 | 5/2019 | Lu et al. | |
| 2019/0197673 | A1* | 6/2019 | Jung | G06T 7/248 |
| 2019/0228508 | A1* | 7/2019 | Price | G06T 7/344 |
| 2021/0217145 | A1* | 7/2021 | El-Khamy | G06T 5/50 |
| 2022/0044430 | A1* | 2/2022 | Eckman | G01S 7/4817 |

OTHER PUBLICATIONS

Faster r-cnn: Towards real-time object detection with region proposal networks, NIPS, 2015.

You Only Look Once: Unified, Real-Time Object Detection, CVPR 2016.

Xu, Ning & Price, Brian & Cohen, Scott & Yang, Jimei & Huang, Thomas. (2017). Deep GrabCut for Object Selection. https://arxiv.org/pdf/1707.00243.pdf.

Y. Zeng, Z. Lin, J. Yang, J. Zhang, E. Shechtman, and H. Lu, High-Resolution Image Inpainting with Iterative Confidence Feedback and Guided Upsampling, European Conf. on Computer Vision, 1-17 (2020).

J. Yu, Z. Lin, J. Yang, X. Shen, X. Lu, and T. S. Huang, Free-Form Image Inpainting with Gated Convolution, Proceedings of IEEE Int'l Conf. on Computer Vision, 4471-80 (2019).

S. Zhao, J. Cui, Y. Sheng, Y. Dong, X. Liang, E. I. Chang, and Y. Xu in Large Scale Image Completion via Co-Modulated Generative Adversarial Networks, arXiv:2103.10428, Int'l Conf. on Learning Representations (2021).

C. Zheng, T.-J. Cham, and J. Cai, TFill: Image Completion via a Transformer-Based Architecture, arXiv:2104:00845 (2021).

Z. Wan, J. Zhang, D. Chen, and J. Liao, High-Fidelity Pluralistic Image Completion with Transformers, arXiv:2103:14031 (2021).

\* cited by examiner

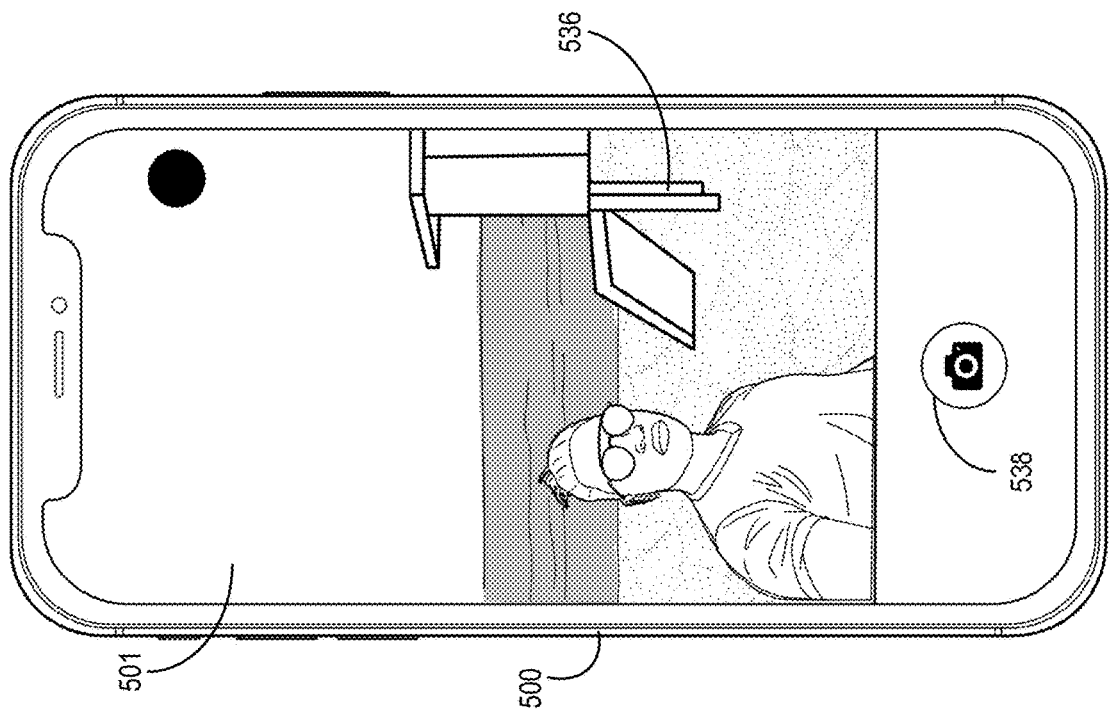
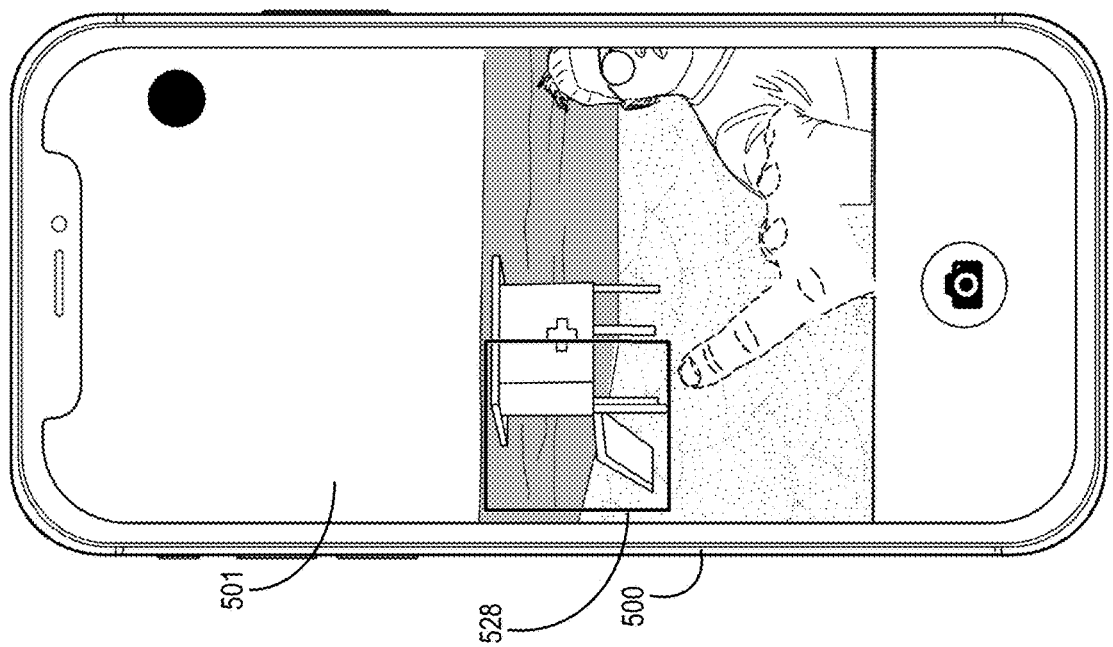
Fig. 5H
Fig. 5G

REMOVING OBJECTS AT IMAGE CAPTURE TIME

BACKGROUND

Recent years have seen a significant increase in digital image editing. Improvements in hardware and software have enhanced the capability of individuals to create and edit digital images. For example, hardware for modern computing devices (e.g., smartphones, tablets, servers, desktops, and laptops) enables amateurs and professionals to perform a variety of digital image editing operations. Additionally, software improvements enable individuals to perform a variety of simple and complex modifications to edit and create digital images. Although conventional digital editing systems allow for a variety of editing operations, such systems have a number of problems in relation to efficiency, accuracy, and flexibility.

BRIEF SUMMARY

Embodiments of the present disclosure provide benefits and/or solve one or more problems in the art with systems, non-transitory computer-readable media, and methods that provide for removal of objects at capture time of a digital image. For example, the disclosed system detects and segments objects in a digital image stream being previewed in a camera viewfinder. In response to a user selection of an object, the disclosed system removes the object and fills a hole left by the removed object with content, thereby allowing a user to preview a scene with the object removed prior to capturing an image. In response to a capture request, the disclosed systems captures a digital image with the object removed. In this manner, the disclosed systems allow for efficient and accurate modifications of a digital image at capture time and eliminates the need for post-process editing.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 5A-5H illustrates a graphical user interface of a client device selecting an area of the image stream for generating a content fill for a removed object in accordance with one or more embodiments.

DETAILED DESCRIPTION

Figure 1:
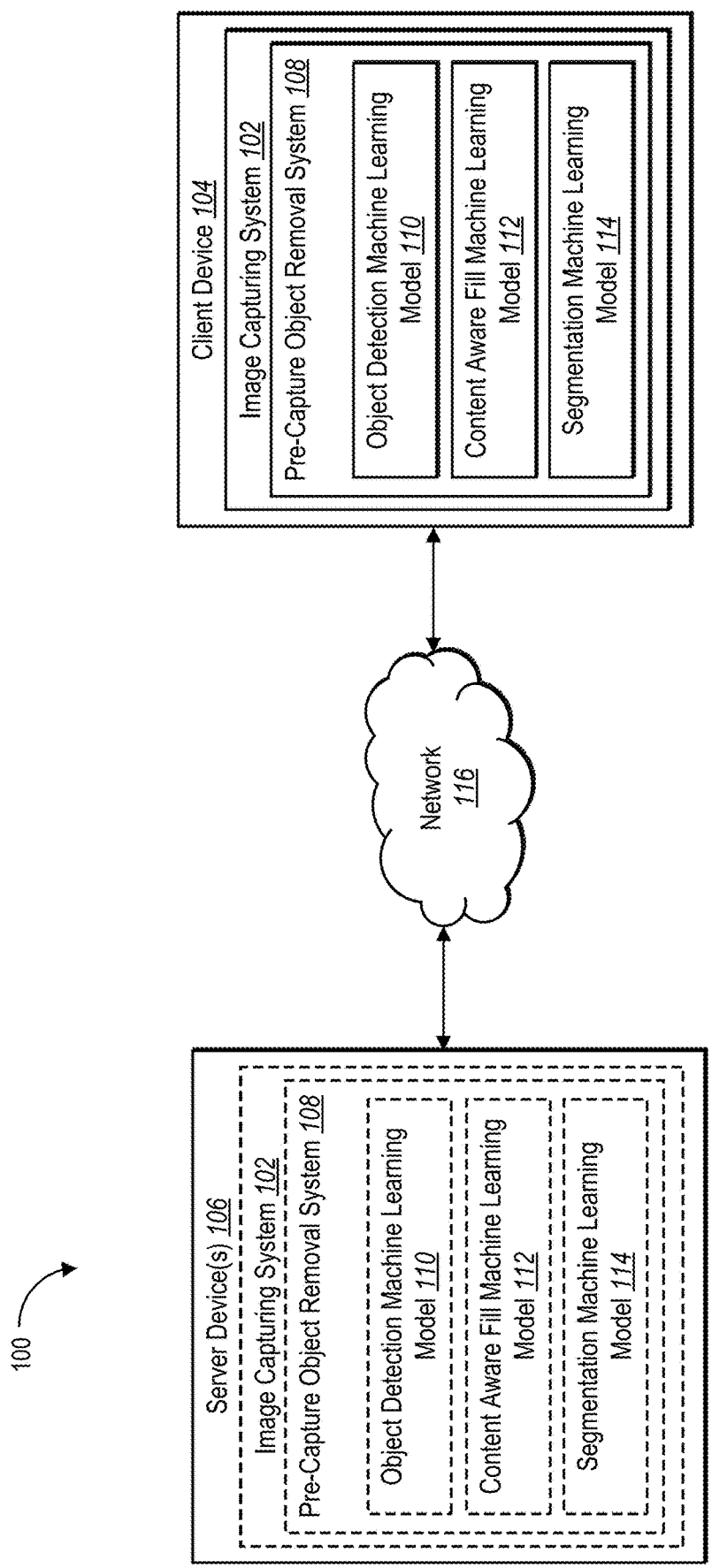
FIG. 1 illustrates a diagram of an environment in which a pre-image capture object removal system operates in accordance with one or more embodiments.

This disclosure describes one or more implementations of a pre-capture object removal system that detects and removes objects prior to capturing a digital image. For example, the pre-capture object removal system displays an image stream being captured by a client device and detects objects in the image stream. The pre-capture object removal system further selects an object in the image stream and removes the object prior to capturing a digital image from the image stream. To elaborate, the pre-capture object removal system detects objects in an image stream. In response to a selection of an object, the pre-capture object removal system removes the object from the image stream and fills a hole corresponding to the removed object with content. The pre-capture object removal system displays the image stream with the object removed to allow a user to preview what an image without the object will look like. In response to a request to capture an image, the pre-capture object removal system captures an image with the object removed.

As mentioned above, the pre-capture object removal system detects objects within an image stream. For example, the pre-capture object removal system detects objects via an object detection machine learning model. In particular, in one or more implementations, the pre-capture object removal system receives frames of the image stream and detects objects in the frames of the image stream. The pre-capture object removal system utilizes, in one or more implementations, the object detection machine learning model to detect a location of an object by generating an approximate boundary for the object. In one or more implementations, the pre-capture object removal system also uses the object detection machine learning model to assign object labels to detected objects.

As also mentioned, the pre-capture object removal system segments objects. For example, the pre-capture object removal system segments objects to be removed from an image stream utilizing a segmentation machine learning model. In particular, the pre-capture object removal system utilizes, in one or more implementations, the segmentation machine learning model to generate an object mask for detected objects that are to be removed. To illustrate, in one or more implementations, in response to a selection of a detected object, the pre-capture object removal system utilizes the segmentation machine learning model to generate an object mask for the object based on the approximate boundary for the object.

Having generated the object mask, in one or more implementations, the pre-capture object removal system removes the object from image stream by deleting the pixels inside of the object mask. As mentioned above, in one or more implantations, the pre-capture object removal system utilizes a content aware fill machine learning model to fill in the hole created by deleting the pixels inside of the object mask. For example, the pre-capture object removal system generates content to fill a hole created by the removal of the selected object utilizing the content aware fill machine learning model in a manner that the image stream and the generated content appears photorealistic. Furthermore, as mentioned above, the pre-capture object removal system captures a digital image. For example, the pre-capture object removal system captures a digital image from the image stream with removed object in response to selection of a capture request.

As mentioned, in one or more implementations, the pre-capture object removal system utilizes the content aware fill machine learning model to generate content to replace a removed object. In some instances, the content generated by the pre-capture object removal system may not have adequate context to produce a photorealistic result. In such instances, the pre-capture object removal system provides the capability for the user to provide context for filling the hole. For example, the pre-capture object removal system provides and displays a movable element on the graphical user interface of the client device. The moveable element allows a user to identify content that should be used to generate the content to fill the hole. For example, the pre-capture object removal system provides the movable element to identify an area in the image stream for the pre-capture object removal system to use as context for generating content to fill the hole. For example, in response to movement of the movable element, the pre-capture object removal system utilizes the content within the moveable element to inform the content aware fill machine learning model when generating the content to fill the hole. Furthermore, the pre-capture object removal system allows the moveable element to be place in areas outside of the original image stream (e.g., allows the user to pan the camera to identify content not visible in the image stream frame from which the object was removed). Thus, the pre-capture object removal system allows for robust generation of content to fill holes created by removing objects.

In one or more implementations, the pre-capture object removal system tracks locations of the detected objects in the frames of the image stream. In particular, for detected objects, the pre-capture object removal system tracks a location of the objects in subsequent frames. For example, if the pre-capture object removal system selects a detected object for removal, the pre-capture object removal system tracks the location of the removed object so that when there is a change to the image stream (client device pans to a different angle or scope) the pre-capture object removal system is able to automatically remove the object in a subsequent frame based on the tracking of that object.

In one or more implementations, the pre-capture object removal system provides a selectable element for each detected object in an image stream to allow a user to select one or more objects for removal. For example, the pre-capture object removal system provides a selectable element on the display of the client device to select objects for removal. In particular, in one or more implementations, the pre-capture object removal system surfaces the approximate boundary for detected objects along with a selectable element that a user can select. In response to a user selection of the selectable element, the pre-capture object removal system removes the corresponding object and fills the corresponding hole with generated content.

In alternative implementations, rather than relying upon user input to select an object from an image stream to delete, the pre-capture object removal system automatically (e.g., without user input) selects an object for removal. For example, the pre-capture object removal system determines a theme of the image stream based on the detected objects. In particular, in one or more implementations, the pre-capture object removal system uses the aforementioned object labels of the detected objects to determine the theme of the image stream. Furthermore, the pre-capture object removal system selects object(s) in the image stream based on the determined theme of the image stream and the object labels. For example, the pre-capture object removal system removes an object with an object label that does not correspond with the identified theme of the image stream.

In one or more additional implementations, the pre-capture object removal system selects objects based on a speed threshold. For example, the pre-capture object removal system detects objects in the image stream and determines an object speed based on locations of the object in subsequent frames. The pre-capture object removal system, in one or more implementations, selects objects for removal that have an object speed that exceeds an object speed threshold.

Recent years have seen significant improvements in editing images. For example, one improvement in conventional systems is the use of artificial intelligence to identify objects in a digital image. In particular, conventional systems often provide the ability to identify objects and remove objects from a captured digital image. Furthermore, conventional systems generate content to replace removed objects from the captured digital image. Unfortunately, conventional image editing systems suffer from a number of drawbacks. For example, conventional image editing system provide the ability to remove and otherwise edit images after capture. Thus, conventional systems are inflexible in that they do not provide the ability for a user to capture the image they may desire (an edited image) but instead require post capture editing. Furthermore, post capture image editing is often time consuming and tedious. For example, conventional systems often require multiple different workflows accessible only by use of multiple different menu dropdowns and tools.

Conventional systems are limited in editing previously captured images. For example, removing objects from a previously captured image often results in generated content to replace removed objects that does not appear photorealistic. This is often due to the fact that conventional systems are limited to using the captured image for context for generating such content. Unfortunately, the captured image often does not provide sufficient context for generating realistic content for replacing removed objects.

The pre-capture object removal system improves on the efficiency of conventional image editing systems by providing efficient editing of images prior to capture. Thus, the pre-capture object removal system eliminates the need for conventional erasers, filters, layers, and other post-capture editing tools. For example, as discussed in the previous paragraphs, the capture object removal system eliminates the need for much post-capture editing of a digital image. Indeed, the capture object removal system allows for efficient and quick capture of an edited digital image with little to no post-capture editing. Accordingly, the pre-capture object removal system conserves both time and computing resources by eliminating the need for many post-capture editing processes.

In addition to the efficiency improvements, the pre-capture object removal system improves on accuracy of conventional systems. For example, because the pre-capture object removal system generates content to replace objects prior to image capture, the pre-capture object removal system is able to use context from the real world beyond the confines of a captured image to inform a content-aware fill algorithm. By generating content and providing a preview of the generated content prior to image capture, the pre-capture object removal system allows a user to determine if the generated content is adequate. If the generated content is not adequate, the pre-capture object removal system allows the user to pan the camera beyond the confines of a current view to identify additional content from a wider scene to inform a content-aware fill algorithm, resulting in more accurate generated content.

As illustrated by the foregoing discussion, the present disclosure utilizes a variety of terms to describe features and advantages of the pre-capture object removal system. Additional detail is now provided regarding the meaning of such terms. For example, as used herein, the term "image stream" or "camera image stream" refers to a live feed from a camera displayed in a camera viewfinder. In particular, "image stream" refers to multiple image frames being captured by a camera at predetermined intervals. Furthermore, an image stream is a preview of content for determining what to capture in a digital image. As such, an image stream is content being captured and presented via a camera viewfinder prior to capture of a digital image.

As mentioned above, the pre-capture object removal system detects objects. For example, as used herein, the term "object" refers to a distinguishable element depicted in a digital image. To illustrate, in some embodiments, an object includes a person, an item, a natural object (e.g., a tree or rock formation) or a structure depicted in an image stream or a digital image. In some instances, an object refers to a plurality of elements that, collectively, can be distinguished from other elements depicted in an image stream or a digital image. For example, in some instances, an object includes a collection of content that makes up a skyline, ground, sky, or water. In some instances, an object more broadly includes a (portion of a) foreground or other element(s) depicted in an image stream as distinguished from a background.

As mentioned above, the pre-capture object removal system generates an object mask for an object. For example, as used herein, the term "object mask" refers to a demarcation useful for partitioning an image into separate portions. In particular, in some embodiments, an object mask refers to an identification of a portion of an image (i.e., pixels of the image stream) belonging to one or more objects and a portion of the image stream belonging to a background and/or other objects. For example, in some embodiments, an object mask includes a map of an image stream that has an indication for each pixel of whether the pixel corresponds to part of an object or not. In some implementations, the indication includes a binary indication (e.g., a "1" for pixels belonging to the object and a "0" for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa.

In one or more embodiments, the pre-capture object removal system assigns an object label to one or more objects. As used herein, the term "object label" refers to a label or tag based on a corresponding classification or type of digital object. In particular, in some embodiments, an object label refers to a label or tag corresponding to a grouping of objects based on one or more attributes that are common to the included objects. To illustrate, in some cases, an object label corresponding to a corresponding classification includes, but is not limited to, a class corresponding to dogs, cats, people, cars, boats, birds, buildings, fruit, phones, or computer devices. The generalization of classifications corresponding to an object label with respect to its included objects varies in different embodiments.

As discussed above, in one or more implementations, the pre-capture object removal system selects unwanted objects. For example, as used herein, the term "unwanted object" refers to a selected object for removal. In particular, an unwanted object includes, but is not limited to, object(s) irrelevant to a theme of the image stream, object(s) selected by a user, or object(s) that exceed a determined speed threshold.

As used herein, the term "neural network" refers to a type of machine learning model, which can be tuned (e.g., trained) based on inputs to approximate unknown functions used for generating the corresponding outputs. In particular, in some embodiments, a neural network refers to a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

Additional detail regarding the pre-capture object removal system will now be provided with reference to the figures. For example, FIG. 1 illustrates a schematic diagram of a system environment 100 that includes an image capturing system 102, a pre-capture object removal system 108, server device(s) 106, a network 116, a client device 104, and one or more machine learning models.

Although the system environment 100 of FIG. 1 is depicted as having a particular number of components, the system environment 100, in one or more implementations, has another number of devices or additional/alternative components (e.g., server devices, client devices, or other components in communication with the pre-capture object removal system 108 via the network 116). Similarly, although FIG. 1 illustrates a particular arrangement of the server device(s) 106, the network 116, and the client device 104, various additional arrangements are possible.

The server device(s) 106, the network 116, and the client device 104 are communicatively coupled with each other either directly or indirectly (e.g., through the network 116 discussed in greater detail below in relation to FIG. 12).

Figure 12:
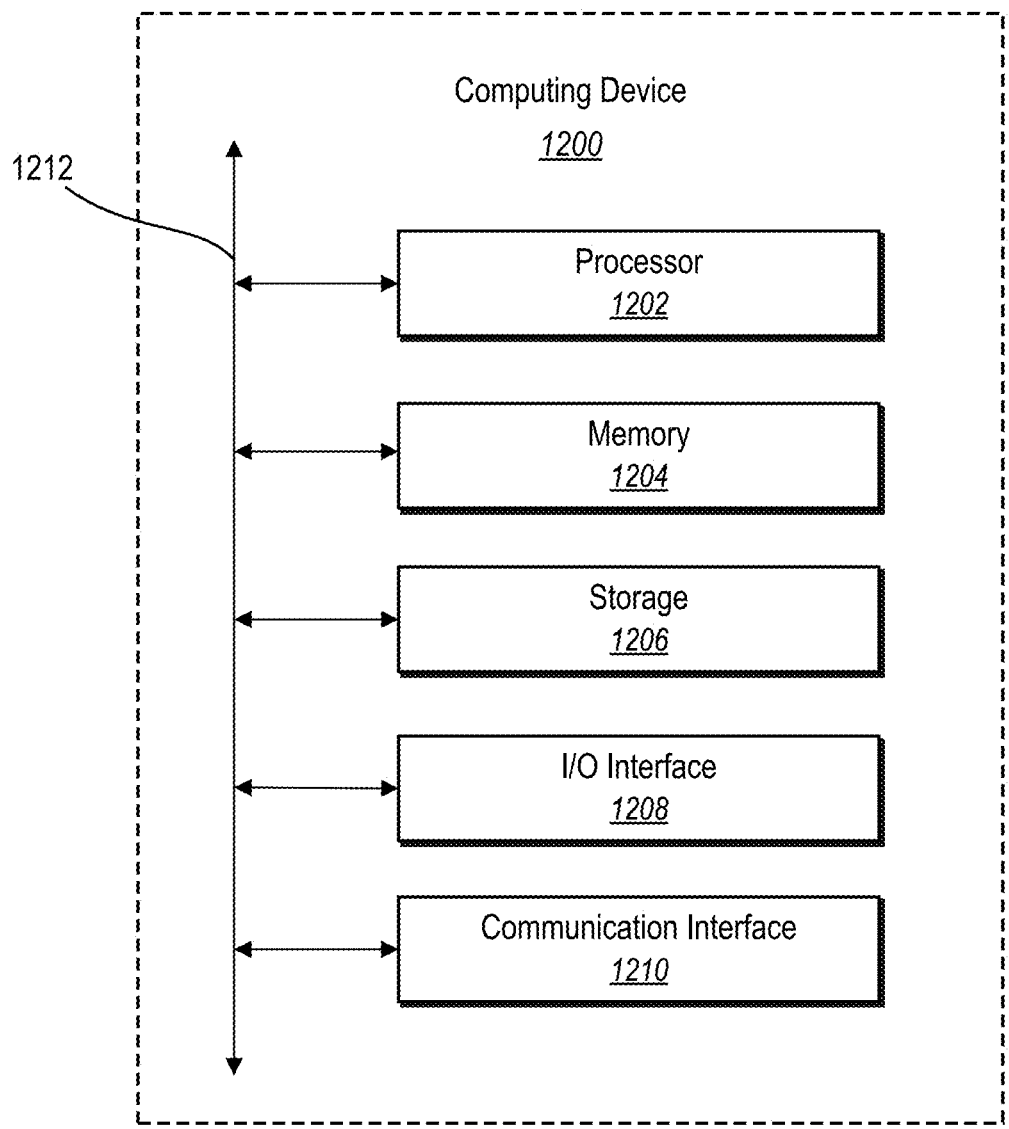
FIG. 12 illustrates a block diagram of an exemplary computing device in accordance with one or more embodiments.

Moreover, the server device(s) 106 and the client device 104 include computing devices such as those discussed in greater detail with relation to FIG. 12.

As shown in FIG. 1, the system environment 100 includes the client device 104, which in one or more implementations, implements the image capturing system 102, the pre-capture object removal system 108, an object detection machine learning model 110, a content aware fill machine learning model 112, and a segmentation machine learning model 114. In one or more embodiments, the client device 104 generates, stores, receives, and/or transmits data including image streams, object detection data, segmentation masks, modified image streams, content fills, and digital images. For example, in some embodiments, the pre-capture object removal system 108 causes the client device 104 to receive an image stream, detect objects, generate object masks, remove objects, and generate content to replace removed objects.

To provide an example, in some embodiments, the pre-capture object removal system 108 is implemented as part of the image capturing system 102 on the client device 104. For example, the client device 104 captures an image stream utilizing a camera of the client device and displays the image stream in a viewfinder on a display device of the client device. The pre-capture object removal system 108 utilizes the object detection machine learning model 110 to detect objects in the image stream. In response to a selection of a detected object, the pre-capture object removal system 108 uses the segmentation machine learning model 114 to segment the selected object by generating an object mask. Using the object mask, the pre-capture object removal system 108 removes the object from the image stream. More specifically, the pre-capture object removal system 108 utilizes the content aware fill machine learning model 112 to fill a hole corresponding to the removed object. The pre-capture object removal system 108 causes the client device 104 to display the image stream with the object removed and replaced by the generated content.

In one or more implementations, the pre-capture object removal system 108 includes a software application installed on the client device 104. Additionally, or alternatively, the pre-capture object removal system 108 includes a software application hosted on the server device(s) 106 (and supported by the image capturing system 102 on the server), which may be accessed by the client device 104 through another application, such as a web browser.

In one or more alternative implementations, the pre-capture object removal system 108 (in whole or part) is implemented by the server device(s) 106. For example, in one or more implementations, a version of the pre-capture object removal system 108 resides on the server device(s) 106 together with the machine learning models. In still further implementations, one or more of the machine learning models reside on the server device(s) 106 and one or more of the machine learning models reside on the client device 104.

In particular, in some implementations, the pre-capture object removal system 108 on the server device(s) 106 supports the pre-capture object removal system 108 on the client device 104. For instance, the pre-capture object removal system 108 on the server device(s) 106 learns parameters for the various machine learning models 110, 112, 114. The pre-capture object removal system 108 on the server device(s) 106 then provides trained machine learning models to the client device 104. In other words, the client device 104 obtains (e.g., downloads) the machine learning models with the learned parameters from the server device(s) 106. Once downloaded, the pre-capture object removal system 108 on the server device(s) 106 on the client device 104 utilizes machine learning models to detect, segment, remove, and replace object prior to image capture independent from the server device(s) 106.

Indeed, the pre-capture object removal system 108 is able to be implemented in whole, or in part, by the individual elements of the system environment 100. Indeed, although FIG. 1 illustrates the pre-capture object removal system 108 implemented with regard to the client device 104, different components of the pre-capture object removal system 108 are able to be implemented by a variety of devices within the system environment 100. For example, in one or more implementations, one or more (or all) components of the pre-capture object removal system 108 are implemented by a different computing device (e.g., the server device 106 or another remote server device).

As shown, FIGS. 2A-2F illustrate a client device 200 displaying various graphical user interfaces generated by the pre-capture object removal system 108. In various implementations, the client device 200 represents the client device 104 introduced above with respect to FIG. 1. As illustrated, the client device 200 includes a client application that implements the pre-capture object removal system 108. The pre-capture object removal system 108, or optionally the image capturing system 102, generates the graphical user interfaces 201 in FIGS. 2A-2F. FIGS. 2A-2F provide an example operation flow of the pre-capture object removal system 108 displaying an image stream in a graphical user interface of a client device, detecting objects, selecting objects, removing objects, replacing the objects with generated content, and capturing a digital image of the image stream with the removed and replaced objects according to one or more implementations.

Figure 2B:
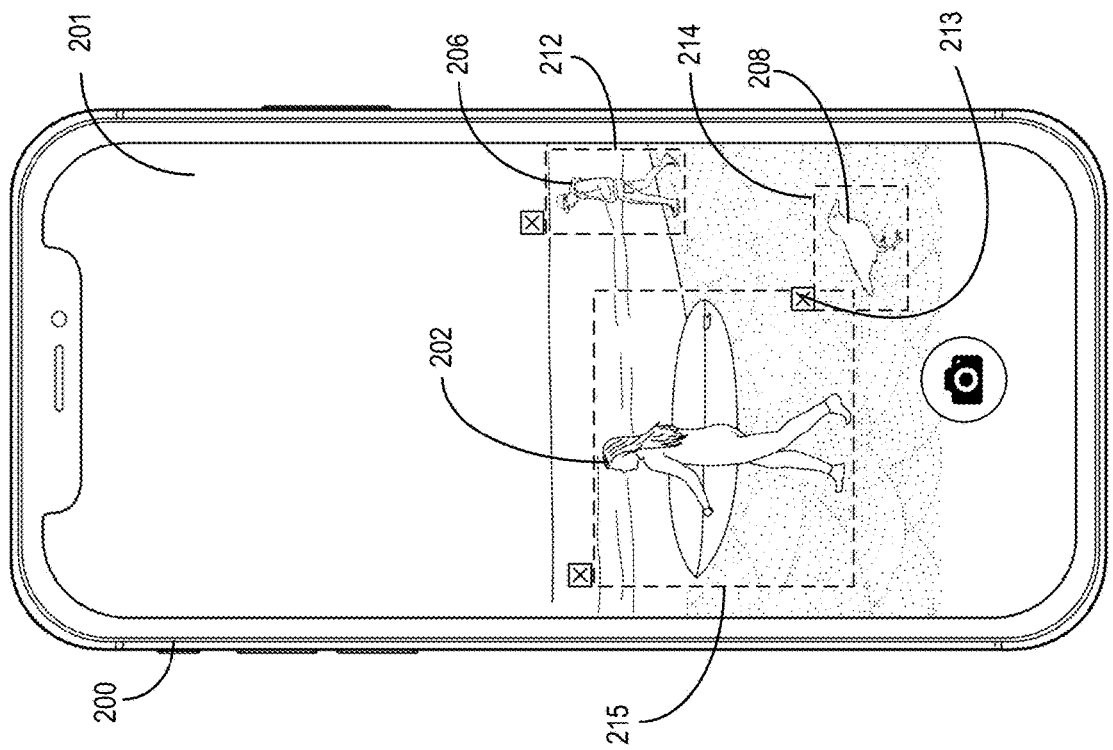
FIGS. 2A-2F illustrates a graphical user interface of a client device detecting objects, removing objects, and filling the removed objects with content in an image stream in accordance with one or more embodiments.
Figure 2A:
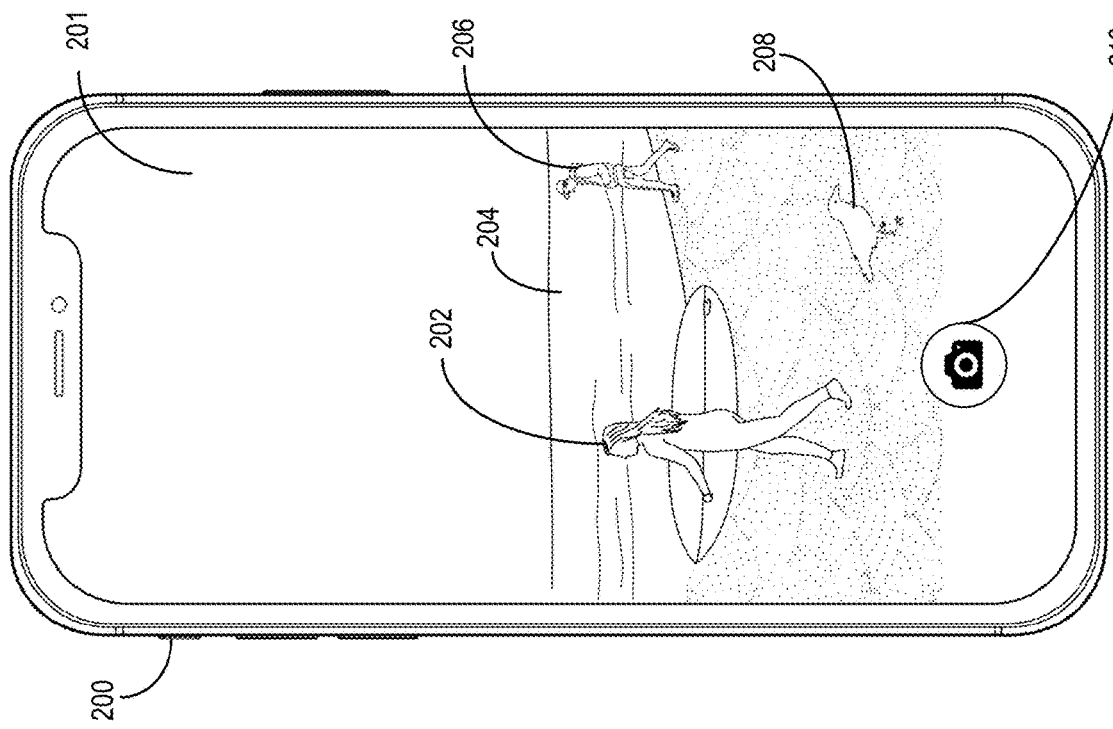

Specifically, as shown in FIG. 2A, the pre-capture object removal system 108 displays an image stream of a surrounding environment. For example, FIG. 2A illustrates the client device 200 capturing an image stream via a camera (on an opposite side of the client device 200). As shown, the client device 200 displays the image stream in a camera viewfinder graphical user interface 201. For example, FIG. 2A shows an image stream with a person 202 in the foreground, a person 206 in the background, a bird 208, and an ocean 204 in the background. The camera viewfinder graphical user interface 201 also includes a selectable image capture element 210. As discussed below, in response to a user selection of the selectable image capture element 210 the pre-capture object removal system 108 captures a digital image of the image stream displayed in the camera viewfinder graphical user interface 201.

As discussed, the pre-capture object removal system 108 detects object in the stream. Specifically, FIG. 2B illustrates the image stream with object detected by the pre-capture object removal system 108 indicated by a graphical user interface element. As shown by FIG. 2B, for each detected object, the pre-capture object removal system 108 generates an approximate boundary (e.g., a bounding box) about the detected object. To illustrate, FIG. 2B shows a bounding box 212 surrounding the person in the background 206 e.g., the man), a bounding box 214 surrounding the bird 208, and a bounding box 215 surrounding the person in the foreground 202 (e.g., the woman). The pre-capture object removal system 108 detects objects and optionally generates approximate boundaries utilizing the object detection machine learning model 110, as described in more detail in relation to FIG. 3.

Additionally, in one or more implementations, the pre-capture object removal system 108 also generates an object label for each detected object. In particular, the pre-capture object removal system 108 utilizes the object detection machine learning model 110 to classify each detected object. The pre-capture object removal system 108, in one or more implementations, surfaces the object label for each detected object by placing the object label next to the approximate boundary for the corresponding object.

In one or more implementations, the pre-capture object removal system 108 generates and surfaces a selectable removal graphical user interface element in connection with each detected object (i.e., a removal indicator). For example, FIG. 2B illustrates that the pre-capture object removal system 108 positions a selectable removal graphical user interface element 213 (e.g., box with an x placed therein) against or proximate the approximate boundary of each detected object. The pre-capture object removal system 108 provides the selectable removal graphical user interface element to allow a user to select object they wish to delete or remove from the image stream.

In one or more implementations, the pre-capture object removal system 108 identifies a foreground object (i.e., the most prominent object in the image stream). For example, the pre-capture object removal system 108 utilizes a salient object detection machine learning model to identify a salient foreground object. In such implementations, the pre-capture object removal system 108 determines that the salient foreground object is the intended subject of an image to be captured. Optionally, in such implementations, the pre-capture object removal system 108 does not place an approximate boundary about the salient foreground object or provide a selectable removal graphical user interface element for the salient foreground object.

Figure 2C:
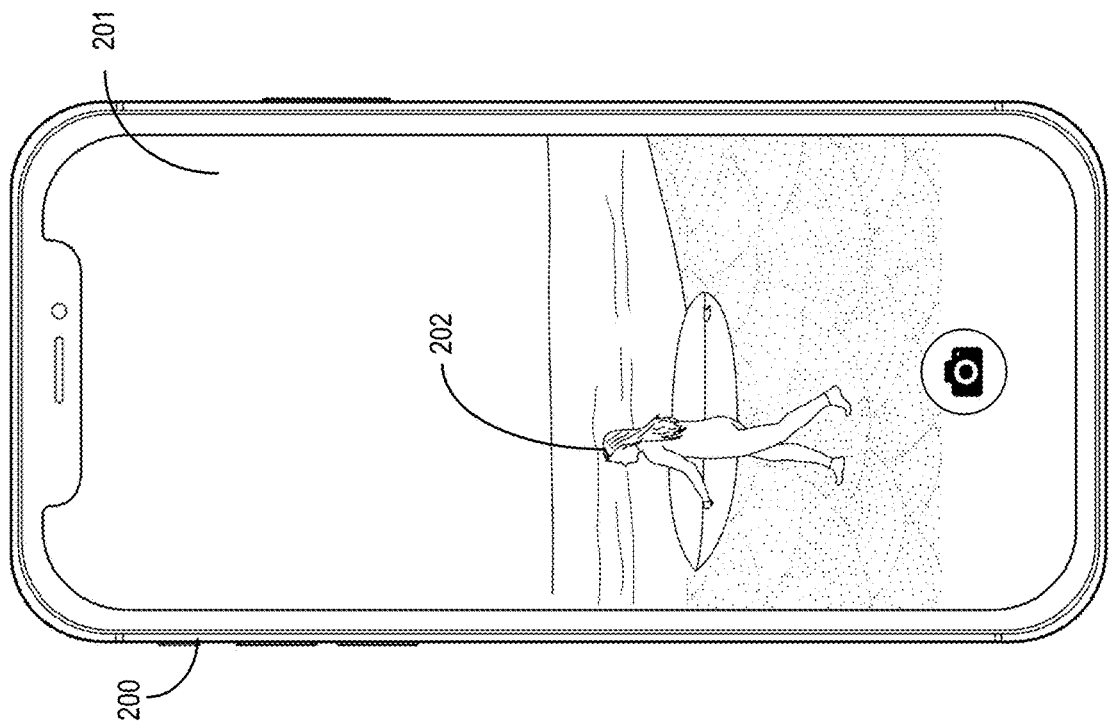

As mentioned above, the selectable removal graphical user interface elements allow a user to identify or select objects to remove from the image stream. Specifically, as shown in FIG. 2C, a user of the client device 200 selects one or more detected objects to delete by selecting the corresponding selectable removal graphical user interface elements 213. To illustrate, FIG. 2C shows a selection of selectable removal graphical user interface elements 213 and 216 by a user.

In response to detecting the selection of a selectable removal graphical user interface element the pre-capture object removal system 108 generates an object mask for the corresponding object. For example, the pre-capture object removal system 108 utilizes the segmentation machine learning model 114 to generate an object mask from the approximate boundary for the object to be removed, as described in greater detail in relation to FIG. 3.

Figure 2D:
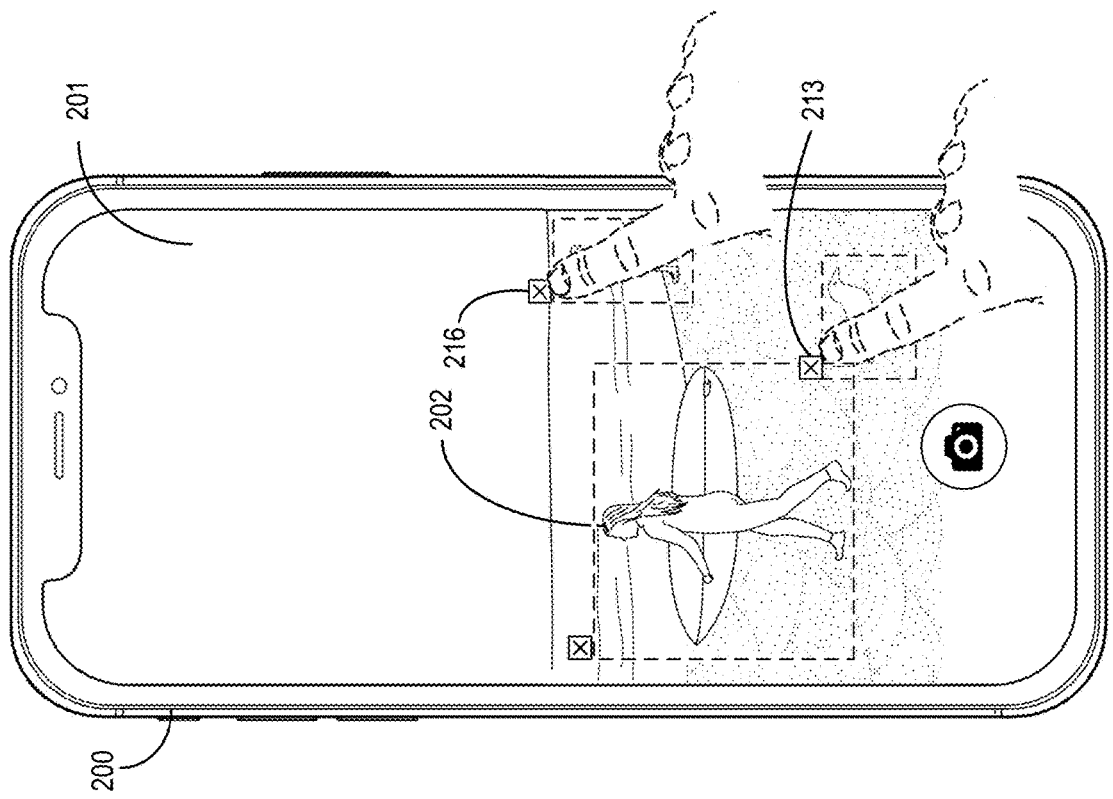

The pre-capture object removal system 108 the removes the corresponding object by deleting the pixels inside the object mask. The pre-capture object removal system 108 then generates content to replace the removed object and fills a hole corresponding to the removed object with the generated content. In particular, as described in greater detail with reference to FIG. 4, the pre-capture object removal system 108 utilizes the content aware fill machine learning model 112 to generate content to replace a removed object. FIG. 2D illustrates the image stream in the camera viewfinder graphical user interface 201 the selected objects (i.e., the bird 208 and person in the background 206) removed and replaced with generated content. FIG. 2D shows a generated content (a content fill) that replaces the removed objects that matches the surrounding sand beach.

As shown by FIG. 2D, the pre-capture object removal system 108 provides a preview via the image stream with the objects removed. This allows the user to preview how an image captured without the objects will appear. As shown by FIG. 2D, the pre-capture object removal system 108 removes objects and replaces them prior to capturing of an image. Furthermore, the pre-capture object removal system 108 provides an image stream via the camera viewfinder graphical user interface 201 with the objects removed.

The user is able to capture a digital image from the image stream with the objects removed. For example, FIG. 2E illustrates capturing a digital image from the image stream. For example, the pre-capture object removal system 108 receives or detects a selection of the selectable image capture element 210. In response, the pre-capture object removal system 108 captures an image reflecting what is shown in the camera viewfinder graphical user interface 201 when the selectable image capture element 210 is selected. In alternative implementations, the pre-capture object removal system 108 captures a digital video rather than a digital image. For example, in response to a selection and holding (e.g., a press and hold) of the selectable image capture element 210, the pre-capture object removal system 108 captures a video reflecting what is shown in the camera viewfinder graphical user interface 201 while the selectable image capture element 210 is selected. In still further implementations, the camera viewfinder graphical user interface 201 includes a separate video capture selectable element. In such implementations, in response to a selection and holding (e.g., a press and hold) of the video capture selectable element, the pre-capture object removal system 108 captures a video reflecting what is shown in the camera viewfinder graphical user interface 201 while the video capture selectable element is selected.

Figure 2F:
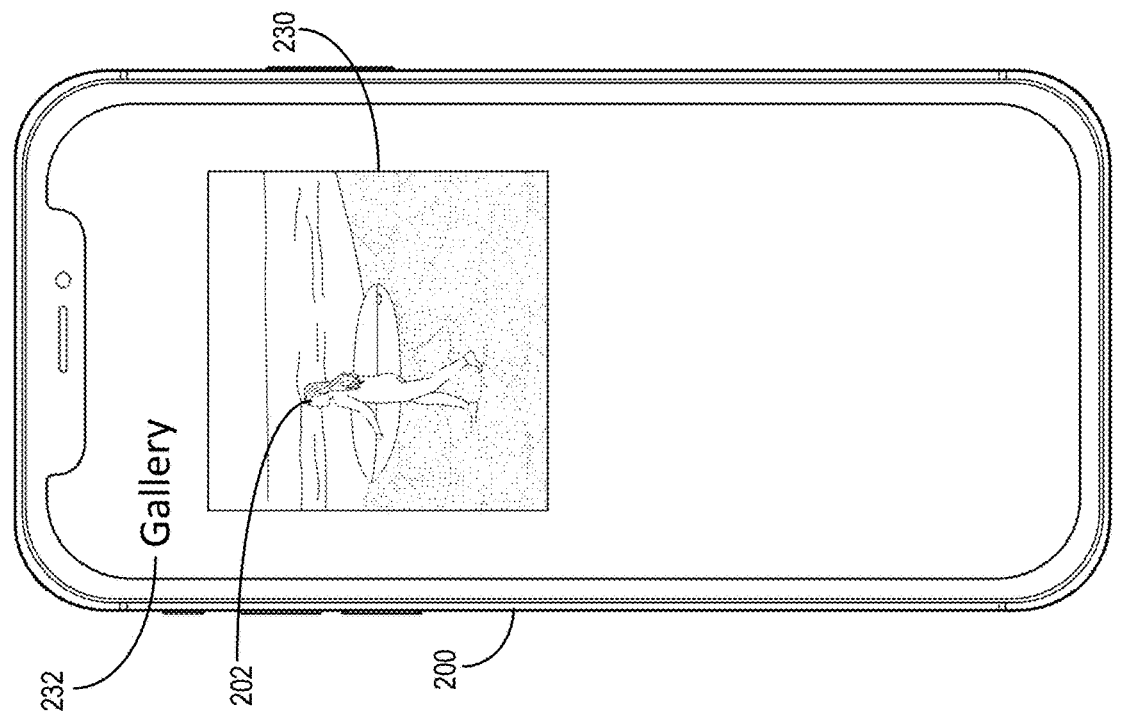
Figure 2E:
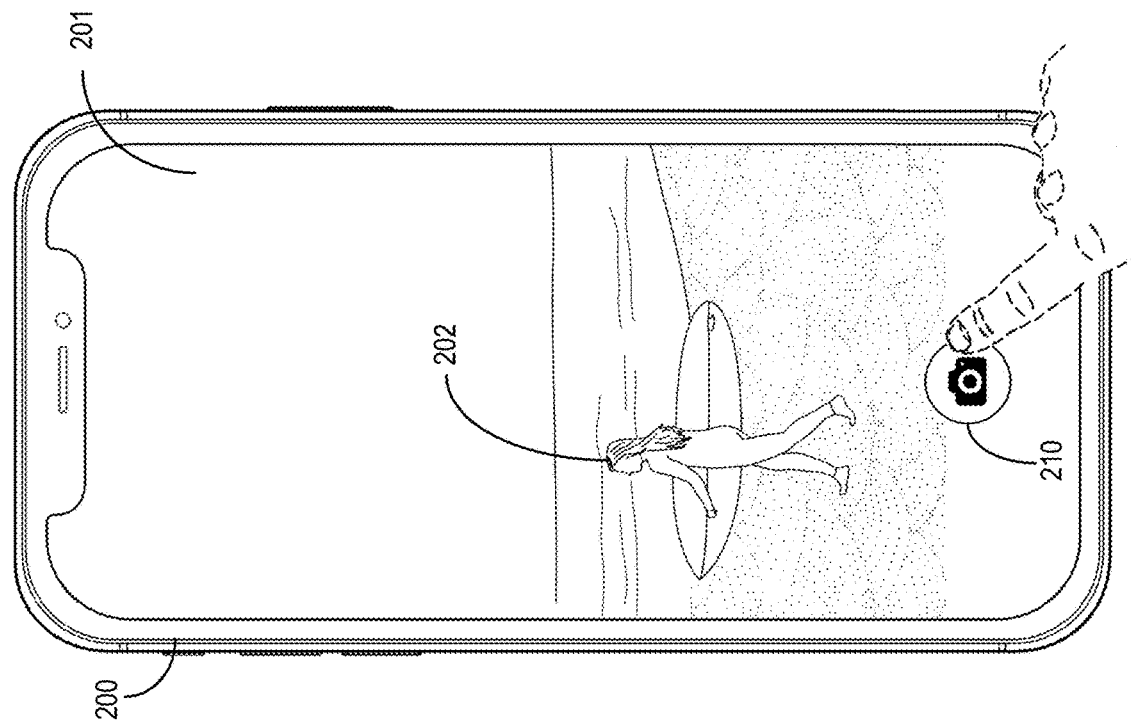

As illustrated in FIG. 2F, in one or more implementations, in response to capturing the digital image in FIG. 2E, the pre-capture object removal system 108 displays the digital image. For example, the pre-capture object removal system 108 shows a digital image 230 with the selected objects removed and replaced. In particular, the digital image 230 represents a single frame from the image stream captured by the pre-capture object removal system 108 with the detected and selected objects removed. As such, as discussed above, by removing selected objects prior to capturing a digital image, the pre-capture object removal system 108 improves upon efficiency and accuracy of digital images.

As also shown in FIG. 2F, in one or more implementations, the pre-capture object removal system 108 displays the digital image 230 within a gallery 232. For example, the gallery 232 includes a plurality of digital images captured utilizing the client device 200 or otherwise transferred to the client device 200. In particular, the gallery 232 includes a client device application that provides access captured digital images as well as digital videos.

Figure 3:
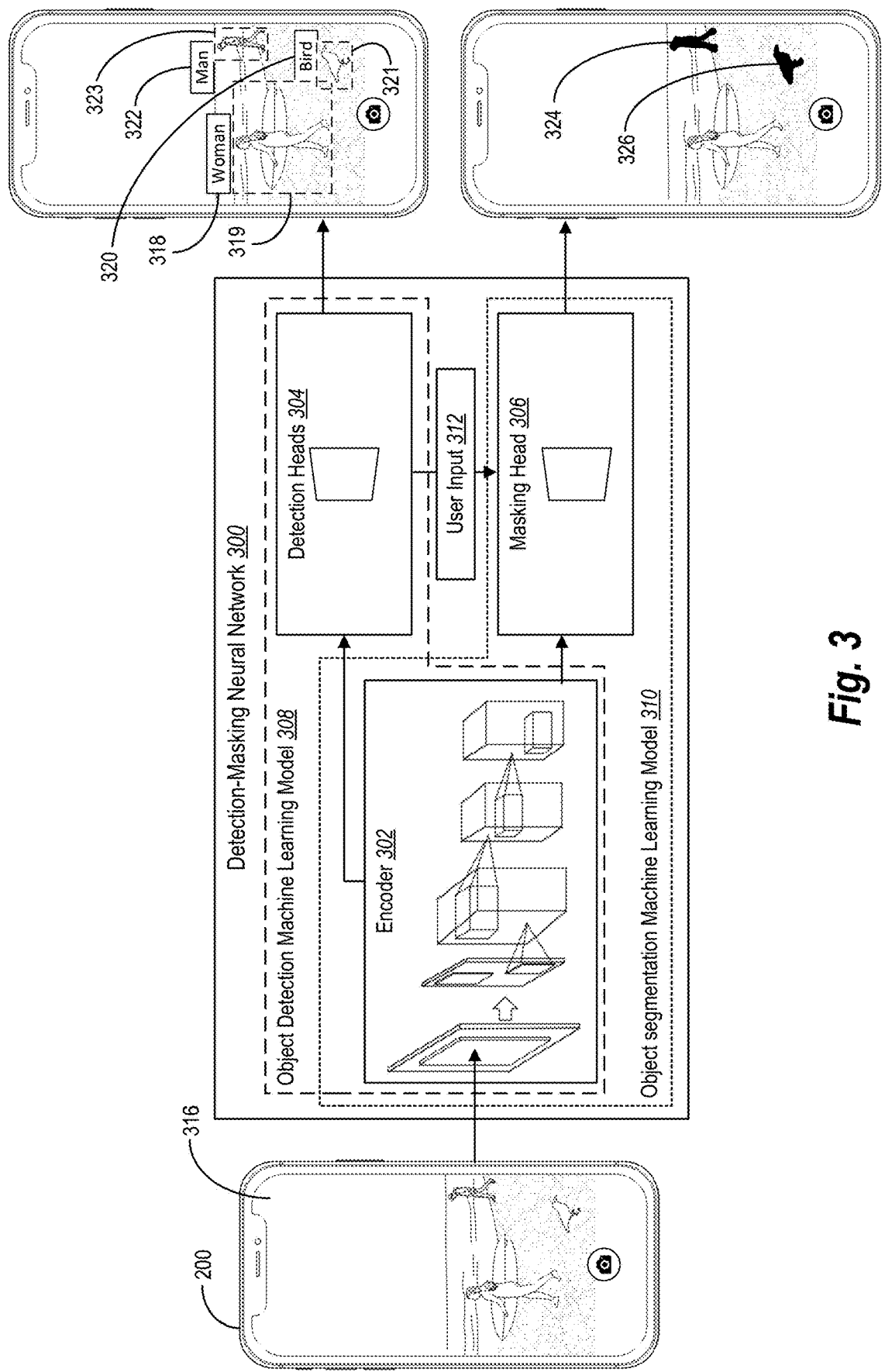
FIG. 3 illustrates a block diagram of the pre-image capture object removal system utilizing an object detection machine learning model and an object segmentation machine learning model in accordance with one or more embodiments.

As mentioned above, the pre-capture object removal system 108 uses an object detection machine learning model to detect objects within the image stream. Specifically, FIG. 3 illustrates one example of an object detection machine learning model that the pre-capture object removal system 108 utilizes in one or more implementations to detect objects with an image stream. Specifically, FIG. 3 illustrates a detection-masking neural network 300 that comprises both an object detection machine learning model 308 (in the form of an object detection neural network) and an object segmentation machine learning model 310 (in the form of an object segmentation neural network). Specifically, the detection-masking neural network 300 is an implementation of the on-device masking system described in U.S. patent application Ser. No. 17/589,114, "DETECTING DIGITAL OBJECTS AND GENERATING OBJECT MASKS ON DEVICE," filed on Jan. 31, 2022, the entire contents of which are hereby incorporated by reference in their entirety.

Although FIG. 3 illustrates the pre-capture object removal system 108 utilizing the detection-masking neural network 300, in one or more implementations, the pre-capture object removal system 108 utilizes different machine learning models to detect and/or generate the object masks for objects. For instance, in one or more implementations, the pre-capture object removal system 108 utilizes, as the object detection machine learning model, one of the machine learning models or neural networks described in U.S. patent application Ser. No. 17/158,527, entitled "Segmenting Objects In Digital Images Utilizing A Multi-Object Segmentation Model Framework," filed on Jan. 26, 2021; or U.S. patent application Ser. No. 16/388,115, entitled "Robust Training of Large-Scale Object Detectors with Noisy Data," filed on Apr. 8, 2019; or U.S. patent application Ser. No. 16/518,880, entitled "Utilizing Multiple Object Segmentation Models To Automatically Select User-Requested Objects In Images," filed on Jul. 22, 2019; or U.S. patent application Ser. No. 16/817,418, entitled "Utilizing A Large-Scale Object Detector To Automatically Select Objects In Digital Images," filed on Mar. 20, 2020; or Ren, et al., *Faster r-cnn: Towards real-time object detection with region proposal networks*, NIPS, 2015; or Redmon, et al., *You Only Look Once: Unified, Real-Time Object Detection*, CVPR 2016, the contents of each of the foregoing applications and papers are hereby incorporated by reference in their entirety.

Similarly, in one or more implementations, the pre-capture object removal system 108 utilizes, as the object segmentation machine learning model, one of the machine learning models or neural networks described in Ning Xu et al., "Deep GrabCut for Object Selection," published Jul. 14, 2017; or U.S. Patent Application Publication No. 2019/0130229, entitled "Deep Salient Content Neural Networks for Efficient Digital Object Segmentation," filed on Oct. 31, 2017; or U.S. patent application Ser. No. 16/035,410, entitled "Automatic Trimap Generation and Image Segmentation," filed on Jul. 13, 2018; or U.S. Pat. No. 10,192,129, entitled "Utilizing Interactive Deep Learning To Select Objects In Digital Visual Media," filed Nov. 18, 2015, each of which are incorporated herein by reference in their entirety.

Returning now to FIG. 3, in one or more implementations, the pre-capture object removal system 108 utilizes a detection-masking neural network 300 that includes a neural network encoder 302 having a backbone network, detection heads 304 (or neural network decoder head), and a masking head 306 (or neural network decoder head). As shown in FIG. 3, the encoder 302 encodes a frame of the image stream and provides the encodings to the detection heads 304 and the masking head 306. The detection heads 304 utilize the encodings to detect one or more digital objects portrayed within a frame of the image stream. The masking head 306 generates at least one object mask for the detected objects.

As also shown in FIG. 3, the pre-capture object removal system 108 captures an image stream utilizing the client device 200. For example, as shown, the pre-capture object removal system 108 preprocesses an image stream at the current viewing angle of the client device 200 to detect/segment objects within frames of the image stream. In particular, the pre-capture object removal system 108 uses object detection components for processing the image stream contemporaneously with viewing the image stream through the camera viewfinder graphical user interface of the client device 200. In one or more implementations, the pre-capture object removal system 108 processes the image stream to detect objects occurs in real-time or near real-time, i.e., within milliseconds of capturing an image stream by client device 200. To illustrate, the pre-capture object removal system 108 an object detection machine learning model 308 and an object segmentation machine learning model 310 as the client device 200 receives an image stream to detect and segment objects.

As just mentioned, the client device 200 utilizes both the object detection machine learning model 308 and the object segmentation machine learning model 310. In one or more implementations, the object detection machine learning model 308 includes both the encoder 302 and the detection heads 304 shown in FIG. 3. While the object segmentation machine learning model 310 includes both the encoder 302 and the masking head 306. Furthermore, the object detection machine learning model 308 and the object segmentation machine learning model 310 are separate machine learning models for processing frames within an image stream. FIG. 3 illustrates the encoder 302, detection heads 304, and the masking head 306 as a single model for detecting and segmenting objects of a frame within an image stream. For efficiency purposes, the pre-capture object removal system 108 utilizes the network illustrated in FIG. 3 as a single network. The collective network (i.e., the object detection machine learning model 308 and the object segmentation machine learning model 310) is referred to as the detection-masking neural network 300. The following paragraphs describe components relating to the object detection machine learning model 308 of the network (such as the detection heads 304) and transitions to discussing components relating to the object segmentation machine learning model 310.

As just mentioned, in one or more embodiments, the pre-capture object removal system 108 utilizes the object detection machine learning model 308 to detect and identify objects within a frame 316 of the image stream. FIG. 3 illustrates one implementation of an object detection machine learning model 308 that the pre-capture object removal system 108 utilizes in accordance with at least one embodiment. In particular, FIG. 3 illustrates an object detection machine learning model 308 utilized by the pre-capture object removal system 108 to detect objects. In one or more embodiments, the object detection machine learning model 308 comprises a deep learning convolutional neural network (CNN). For example, in some embodiments, the object detection machine learning model 308 comprises a region-based (R-CNN).

As shown in FIG. 3, the object detection machine learning model 308 includes lower neural network layers and higher neural network layers. In general, the lower neural network layers collectively form the encoder 302 and the higher neural network layers collectively form the detection heads 304 (e.g., decoder). In one or more embodiments, the encoder 302 includes convolutional layers that encodes frames of an image stream into feature vectors, which are outputted from the encoder 302 and provided as input to the detection heads 304. In various implementations, the detection heads 304 comprise fully connected layers that analyze the feature vectors and output the detected objects (potentially with approximate boundaries around the objects).

In particular, the encoder 302, in one or more implementations, comprises convolutional layers that generate a feature vector in the form of a feature map. To detect objects within the frame 316 of the image stream, the object detection machine learning model 308 processes the feature map utilizing a convolutional layer in the form of a small network that is slid across small windows of the feature map. The object detection machine learning model 308 then maps each sliding window to a lower-dimensional feature. The object detection machine learning model 308 then processes this feature using two separate detection heads that are fully connected layers. In particular, the first head can comprise a box-regression layer that generates the detected object and an object-classification layer that generates the object label.

As shown by FIG. 3, the output from the detection heads 304 shows object labels above each of the detected objects. For example, the pre-capture object removal system 108, in response to detecting objects, assigns an object label to each of the detected objects. In particular, as previously discussed, the pre-capture object removal system 108 utilizes object labels based on classifications of the objects. To illustrate, FIG. 3 shows a label 318 for woman, a label 320 for man, and a label 322 for bird.

As mentioned, the object detection machine learning model 308 detects the objects within the frame 316 of the image stream. In some embodiments, and as illustrated in FIG. 3, the pre-capture object removal system 108 indicates the detected objects utilizing approximate boundaries (e.g., bounding boxes 319, 321, and 323). For example, each of the bounding boxes comprises an area that encompasses an object. In some embodiments, the pre-capture object removal system 108 annotates the bounding boxes with the previously mentioned object labels such as the name of the detected object, the coordinates of the bounding box, and/or the dimension of the bounding box.

As illustrated in FIG. 3, the object detection machine learning model 308 detects several objects for the frame 316 of the image stream. In some instances, the pre-capture object removal system 108 identifies all objects within the bounding boxes. For example, the bounding boxes comprise the approximate boundary area indicating the detected object. An approximate boundary refers to an indication of an area including an object that is larger and/or less accurate than an object mask. In one or more embodiments, an approximate boundary can include at least a portion of a detected object and portions of the frame 316 of the image stream not comprising the detected object. An approximate boundary includes any shape, such as a square, rectangle, circle, oval, or other outline surrounding an object. In one or more embodiments, an approximate boundary comprises a bounding box.

Upon detecting the objects in the frame 316 of the image stream, the pre-capture object removal system 108 generates object masks for the detected objects. Generally, instead of utilizing coarse bounding boxes during object localization, the pre-capture object removal system 108 generates segmentations masks that better define the boundaries of the object. The following paragraphs provide additional detail with respect to generating object masks for detected objects in accordance with one or more embodiments. In particular, FIG. 3 illustrates the pre-capture object removal system 108 utilizing the object segmentation machine learning model 310 to generate segmented objects in accordance with some embodiments.

As illustrated in FIG. 3, the pre-capture object removal system 108 processes a detected object in a bounding box utilizing an object segmentation machine learning model 310 to generate an object mask, such as object mask 324 and object mask 326. In alternative embodiments, the pre-capture object removal system 108 utilizes the object detection machine learning model 308 itself to generate an object mask of the detected object (e.g., segment the object for selection).

In one or more implementations, prior to generating an object mask of a detected object, the pre-capture object removal system 108 receives user input 312 to determine objects for which to generate object masks. For example, the pre-capture object removal system 108 receives input from a user of the client device 200 indicating a selection of one of the detected objects. In particular, the user input 312 includes a user tapping a portion of the graphical user interface of the client device 200 to select one or more of the detected objects. To illustrate, the pre-capture object removal system 108 receives user input 312 of the user selecting bounding boxes 321 and 323.

As mentioned, the pre-capture object removal system 108 processes the bounding boxes of the detected objects in the frame 316 of the image stream utilizing the object segmentation machine learning model 310. In some embodiments, the bounding box comprises the output from the object detection machine learning model 308. For example, as illustrated in FIG. 3, the bounding box comprises a rectangular border about the object. Specifically, FIG. 3 shows bounding boxes 319, 321 and 323 which surround the woman, the bird, and the man detected in the frame 316 of the image stream.

The pre-capture object removal system 108 utilizes the object segmentation machine learning model 310 to generate the object masks for the aforementioned detected objects within the bounding boxes. For example, the object segmentation machine learning model 310 corresponds to one or more deep neural networks or models that select an object based on bounding box parameters corresponding to the object within the frame 316 of the image stream. In particular, the object segmentation machine learning model 310 generates object masks 324 and 326 for the detected man and bird.

In some embodiments, the pre-capture object removal system 108 selects the object segmentation machine learning model 310 based on the object labels of the object identified by the object detection machine learning model 308. Generally, based on identifying one or more classes of objects associated with the input bounding boxes, the pre-capture object removal system 108 selects an object segmentation machine learning model tuned to generate object masks for objects of the identified one or more classes. To illustrate, in some embodiments, based on determining that the class of one or more of the identified objects comprises a human or person, the pre-capture object removal system 108 utilizes a special human object mask neural network to generate an object mask such as object mask 324 shown in FIG. 3.

As further illustrated in FIG. 3, the pre-capture object removal system 108 receives the object masks 324 and 326 as output from the object segmentation machine learning model 310. Generally, an object mask comprises a pixel-wise mask that corresponds to an object in a frame of the image stream. In one example, the object mask includes a segmentation boundary indicating a predicted edge of one or more objects as well as pixels contained within the predicted edge.

The pre-capture object removal system 108 also detects the objects shown in the frame 316 of the image stream on the client device 200 via the collective network, i.e., the detection-masking neural network 300, in the same manner outlined above. For example, the image capturing system via the detection-masking neural network 300 detects the woman, the man, and the bird within the frame 316 of the image stream. In particular, the pre-capture object removal system 108 via the detection heads 304 utilizes the feature pyramids and feature maps to identify objects within the frame 316 and based on user input 312 generates object masks via the masking head 306.

Furthermore, in regard to object detection, object labels, and object segmentation, the pre-capture object removal system 108 repeats the same principles for subsequently received frames received from the image stream. In particular, for a second frame that involves different or moved objects within the image stream, the pre-capture object removal system 108 again utilizes the detection-masking neural network 300 to output detected objects, object labels, and object masks (based on user input 312) for the detected objects. To illustrate, if the camera viewfinder of the client device 200 pans to the left and detects a man surfer, then the pre-capture object removal system 108 generates a bounding box for the detected man, indicates output label: "Man 2," and generates an object mask if user input 312 so indicates.

Furthermore, in one or more implementations, although FIG. 3 illustrates generating object masks based on the user input 312, the pre-capture object removal system 108 generates object masks without user input 312. In particular, the pre-capture object removal system 108 generates object masks for all detected objects within the frame 316 of the image stream. To illustrate, despite receiving no user input 312, the pre-capture object removal system 108 generates an object mask for the woman, the man, and the bird.

Figure 4:
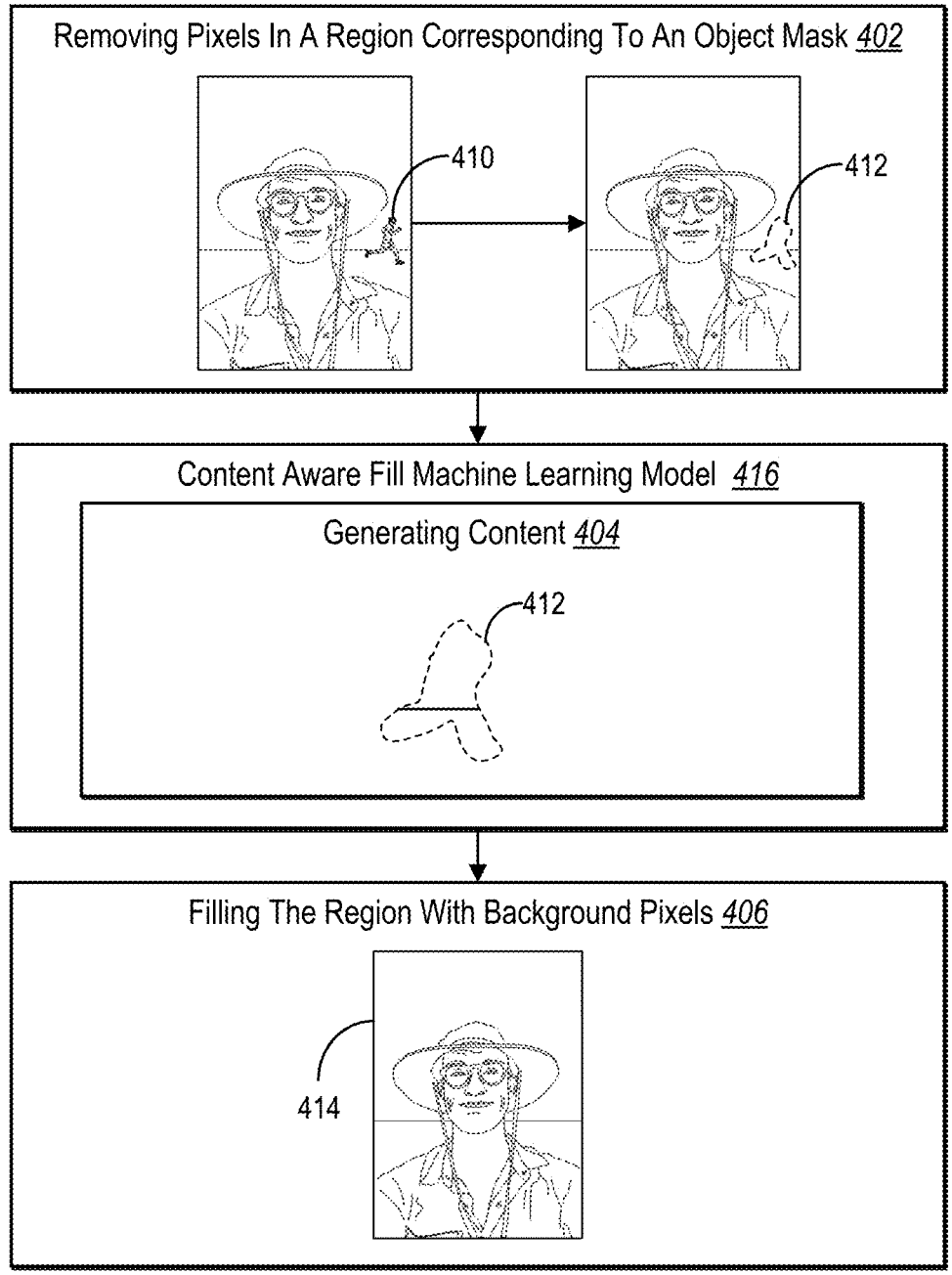
FIG. 4 illustrates a block diagram of the pre-image capture object removal system utilizing a content aware fill machine learning model in accordance with one or more embodiments.

Having generated an object mask for a detected and selected object, the pre-capture object removal system 108 deletes the pixel of the object mask generating a hole, generates content to fill the hole utilizing a content aware fill machine learning model 416, and fills the hole with the generated content. For example, FIG. 4 illustrates the pre-capture object removal system 108 an overview of this process. In some embodiments, the pre-capture object removal system 108 performs the acts described in FIG. 3 for generating object masks for objects in a frame of the image stream. Upon determining object masks based on user input and selecting an object in the frame of the image stream, the pre-capture object removal system 108 manipulates pixels associated with object masks in the frame of the image stream to generate a modified frame of the image stream. FIG. 4 illustrates a series of acts 400 by which the pre-capture object removal system 108 generates the modified frame of the image stream in accordance with one or more embodiments. In particular, the series of acts 400 includes an act 402 of removing pixels in a region corresponding to an object mask selected for removal, an act 404 of generating content to replace the removed object via a content aware fill machine learning model 416, and an act 406 of filling the region/hole with background pixels.

As illustrated in FIG. 4, the pre-capture object removal system 108 performs the act 402 of removing pixels in a region corresponding to an object mask. In particular, the pre-capture object removal system 108 identifies the object to manipulate in the frame of the image stream. For example, and as illustrated, the pre-capture object removal system 108 determines (e.g., based on a user selection) that an object 410 is to be deleted. The pre-capture object removal system 108 accesses the object mask corresponding to the object 410. The pre-capture object removal system 108 determines a region 412 in the image that corresponds to the object mask. The pre-capture object removal system 108 removes or deletes the pixels in the region 412 corresponding to the object mask of the object 410.

As further illustrated in FIG. 4, the pre-capture object removal system 108 performs the act 404 of generating content to replace the object. In particular, the pre-capture object removal system 108 generates pixels within the region 412 corresponding to the object mask of the object 410. In some embodiments, the pre-capture object removal system 108 generates the pixels within the region 412 utilizing the content aware fill machine learning model 416.

In one or more implementations, the pre-capture object removal system 108 utilizes a content aware fill machine learning model 416 in the form of a deep inpainting model to generate the content (and optionally fill) the hole corresponding to the removed object. For example, the pre-capture object removal system 108 utilizes a deep inpainting model trained to fill holes. In some embodiments, the pre-capture object removal system 108 utilizes ProFill as described by Y. Zeng, Z. Lin, J. Yang, J. Zhang, E. Shechtman, and H. Lu, *High-Resolution Image Inpainting with Iterative Confidence Feedback and Guided Upsampling*, European Conf. on Computer Vision, 1-17 (2020)); or DeepFillv2 as described by J. Yu, Z. Lin, J. Yang, X. Shen, X. Lu, and T. S. Huang, *Free-Form Image Inpainting with Gated Convolution*, Proceedings of IEEE Int'l Conf. on Computer Vision, 4471-80 (2019), the entire contents of which are hereby incorporated by reference.

Alternatively, the pre-capture object removal system 108 utilizes a deep inpainting model in the form of the CoMod-GAN model described by S. Zhao, J. Cui, Y. Sheng, Y. Dong, X. Liang, E. I. Chang, and Y. Xu in *Large Scale Image Completion via Co-Modulated Generative Adversarial Networks*, arXiv:2103.10428, Int'l Conf. on Learning Representations (2021), the entire contents of which are hereby incorporated by reference. In other embodiments, the pre-capture object removal system 108 utilizes a different deep inpainting model such as a transformer-based model such as TFill (C. Zheng, T.-J. Cham, and J. Cai, *TFill: Image Completion via a Transformer-Based Architecture*, arXiv:2104:00845 (2021)) or ICT (Z. Wan, J. Zhang, D. Chen, and J. Liao, *High Fidelity Pluralistic Image Completion with Transformers*, arXiv:2103:14031 (2021)), the entire contents of which are hereby incorporated by reference.

The series of acts 400 includes the act 406 of filling the region with generated pixels. In particular, the pre-capture object removal system 108 generates a modified frame 414 of the image stream by filling the region 412 with pixels generated in the previous step. In one or more implementations, the pre-capture object removal system 108 presents the modified frame 414 of the image stream for display on the graphical user interface via the camera viewfinder of the client device. Thus, the pre-capture object removal system 108 provides an option for a user to contemporaneously view the generated content in place of the removed object as the client device is capturing the image stream. A user of the client device then is able to choose to capture the displayed modified frame 414 of the image stream as a digital image for storage on the client device.

As discussed above, the pre-capture object removal system 108 utilizes the content aware fill machine learning model to fill a hole corresponding to a removed object. In one or more implementations, the content aware fill machine learning model may not provide the result that the user desires. In such implementations, the pre-capture object removal system 108 provides an interactive process to allow the user to provide an area of a scene to inform the content aware fill machine learning model. For example, the pre-capture object removal system 108, in one or more implementations, allows a user to select content to use to fill the hole as part of a content-aware move process. Furthermore, because the digital image has not yet been captured, the pre-capture object removal system 108 allows a user to identify content outside of the image frame that includes the hole. Specifically, the pre-capture object removal system 108 allows the user to pan the camera viewfinder to identify content in the real-world scene outside of the image frame being filled. Specifically, FIGS. 5A-5H shows graphical user interfaces provided by the pre-capture object removal system 108 as part of a user-assisted content-aware move process to fill a hole created by removing an object.

Figure 5B:
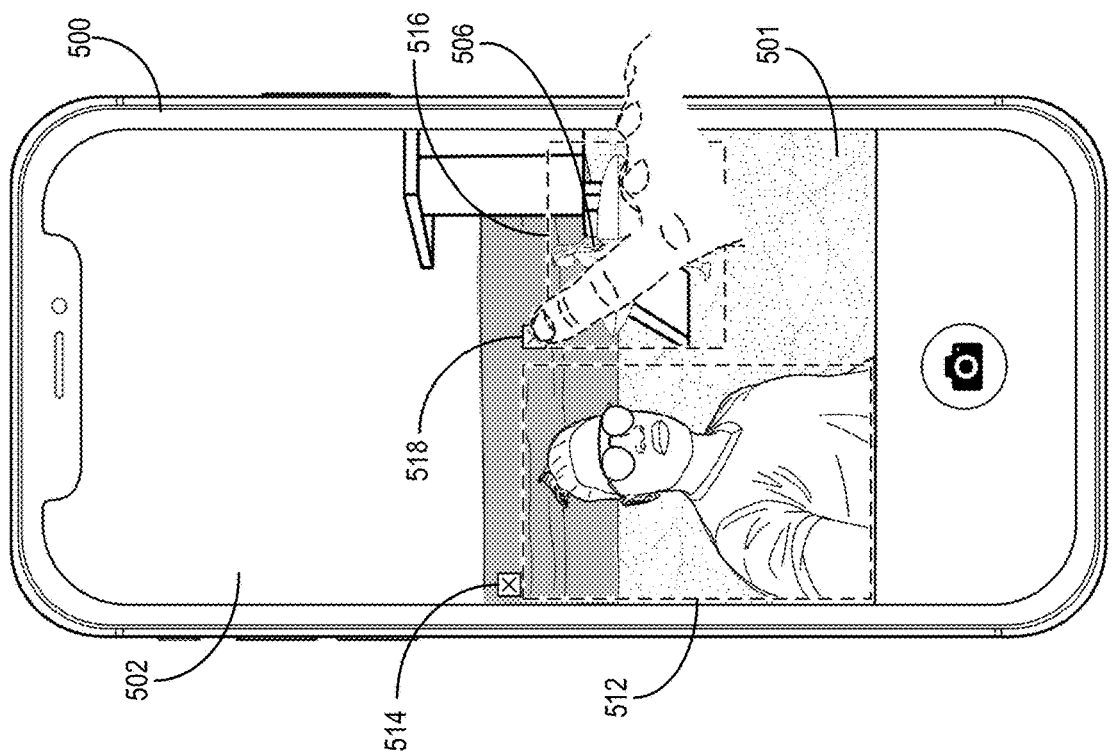
Figure 5A:
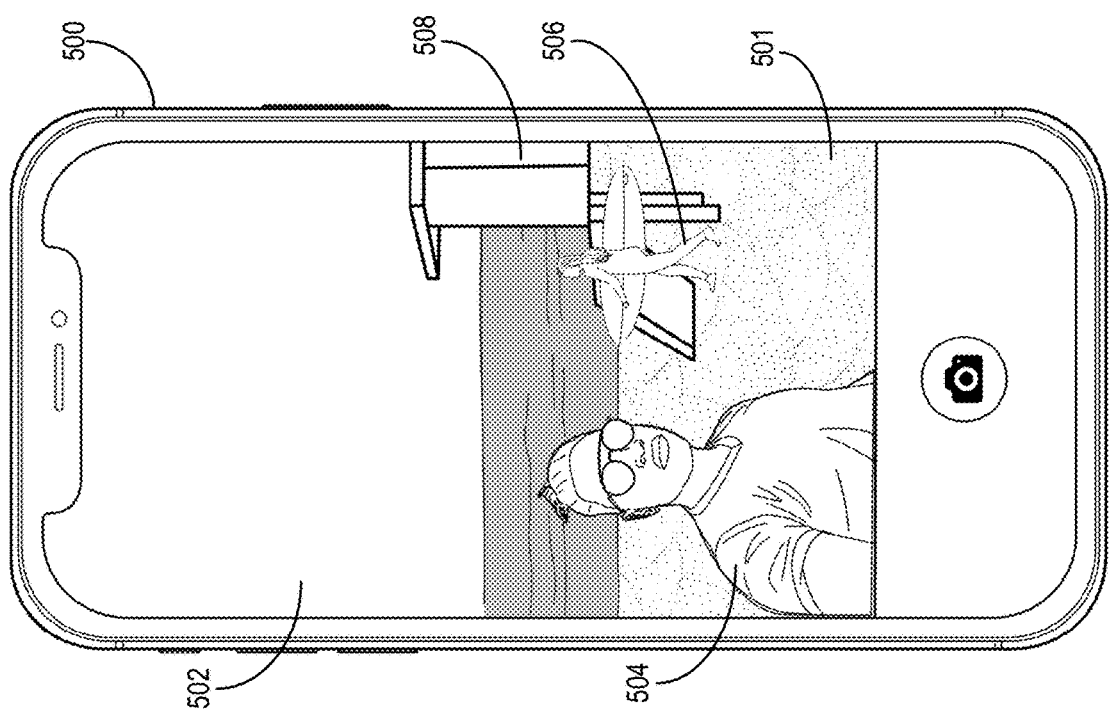

FIG. 5A illustrates the pre-capture object removal system 108 displaying a camera viewfinder graphical user interface 501 on a client device 500. In particular, FIG. 5A shows an image stream 502 being captured from the front camera viewfinder (e.g., a "selfie" camera). In particular, FIG. 5A illustrates that the image stream 502 includes a foreground object 504 and background subject objects 506 and 508, and 510. Although FIG. 5A illustrates the image stream 502 being captured from the front camera viewfinder, in one or more example embodiments the image stream is captured from a different camera viewfinder (e.g., the primary camera viewfinder).

FIG. 5B illustrates the pre-capture object removal system 108 detecting objects in the image stream 502 displayed in the camera viewfinder graphical user interface 501. For example, FIG. 5B shows the pre-capture object removal system 108 detecting a foreground or salient object 504 and placing an approximate boundary about the detected foreground object 504. Additionally, the pre-capture object removal system 108 detects and places an approximate boundary 516 about the background object 506.

FIG. 5B shows that the pre-capture object removal system 108 generates and displays selectable removal graphical user interface elements about the detected objects. For example, FIG. 5B illustrates selectable removal graphical user interface elements 514 and 518 corresponding respective to approximate boundaries (i.e., bounding boxes) 512 and 516. Furthermore, FIG. 5B shows a user selecting the selectable removal graphical user interface element to remove the background object 506. To illustrate, in one or more example embodiments, in response to the selection of the selectable removal graphical user interface element 518, the graphical user interface of the client device 500 displays the camera viewfinder graphical user interface of FIG. 5C.

Figure 5D:
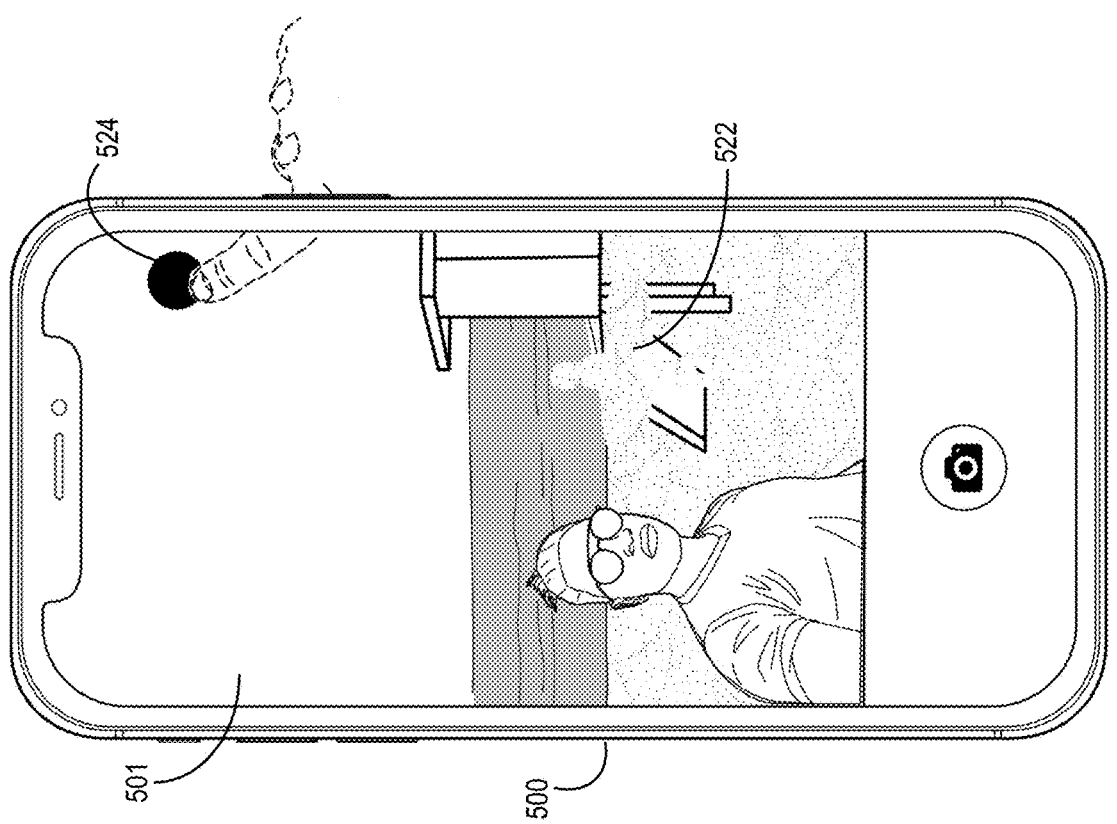
Figure 5C:
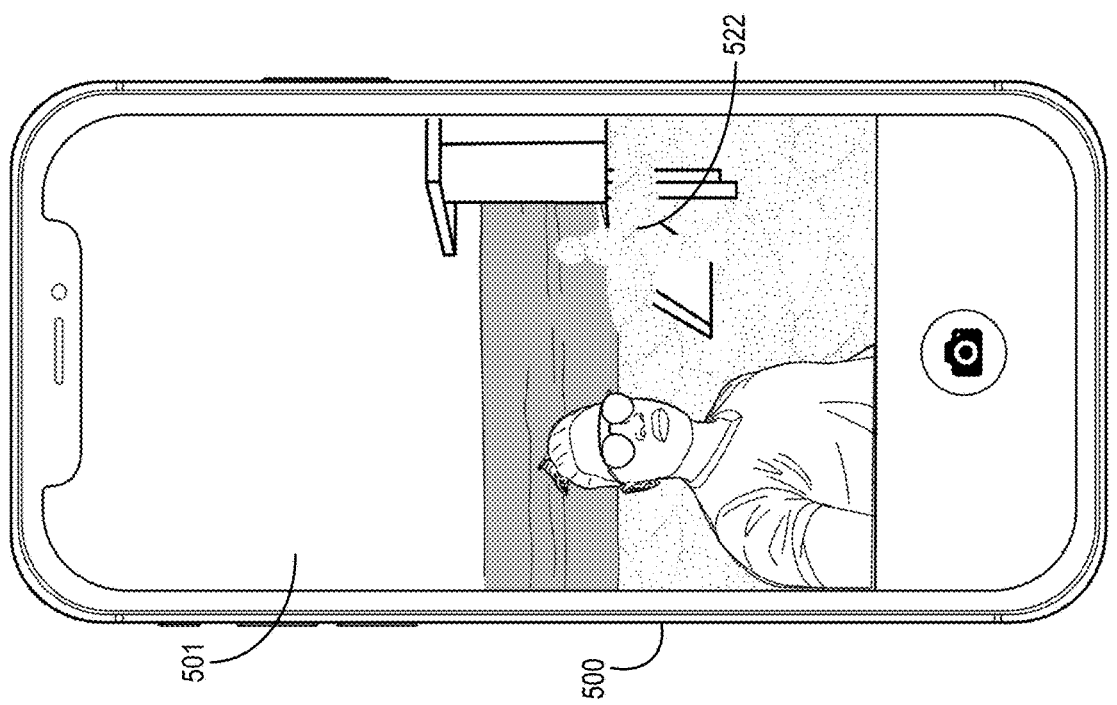

As previously mentioned, the pre-capture object removal system 108 via the content aware fill machine learning model generates content 522 to replace the removed object. For example, the pre-capture object removal system 108 generates the content 522 by utilizing the content aware fill machine learning model. In particular, the content aware fill machine learning model uses remaining pixels in the image frame as content to fill a hole created by removing the object 506. As shown, in FIG. 5C the content generated by the content aware fill machine learning model in this example does not match background perfectly. In particular, the pre-capture object removal system 108 via the content aware fill machine learning model generates inaccurate content and uses that content to fill a hole corresponding to removed objects. To illustrate, FIG. 5C shows the secondary subject object 506 (the woman) removed, but in place of the removed woman, the content aware fill machine learning model uses pixels based on the background beach to fill portions of the hole that should be part of the lifeguard tower.

In one or more implementations, the pre-capture object removal system 108 generates inaccurate content for removed objects when the surrounding area is lacking context to fill the area being removed. In particular, when a foreground object occupies most of the image stream and when a secondary subject object is selected for removal, the pre-capture object removal system 108 may lack context for generating a content for a hole for a background object being removed. As another illustration example, if an object is being removed from an area of the image having a repeating pattern that is covered by the object, the content aware fill machine learning model may not be able to generate accurate content of the repeating pattern as it was hidden by the object being removed.

In one or more implementations, the pre-capture object removal system 108 provides an option to indicate that the content generated to fill a hole is inaccurate. For example, FIG. 5D illustrates that the pre-capture object removal system 108 generates and places a selectable option 524 to initiate a user assisted content generation process. In particular, the selectable option 524 includes a selectable icon in the graphical user interface 501.

FIG. 5D shows a user selecting the selectable option 524. In particular, FIG. 5D shows a user of the client device 500 selecting the selectable option 524 to notify the pre-capture object removal system 108 of the insufficient content generated to fill the hole created by removing the object. In response to a selection of the selectable option 524, the pre-capture object removal system 108 initiates a user-assisted content generation workflow.

Figure 5F:
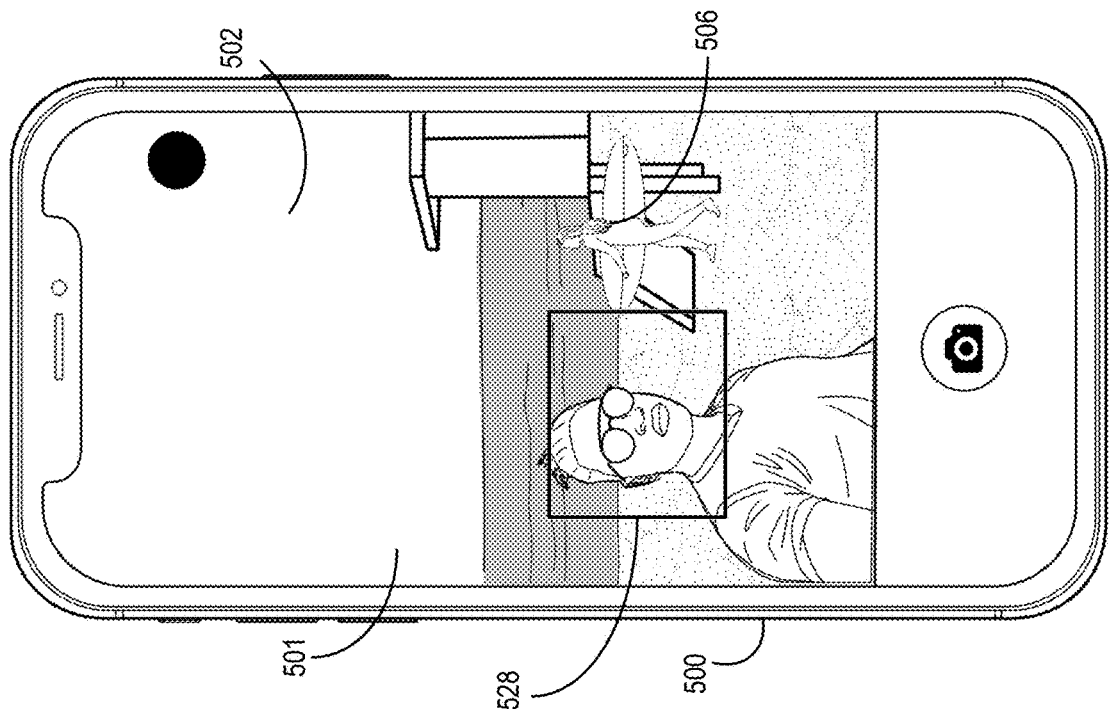
Figure 5E:
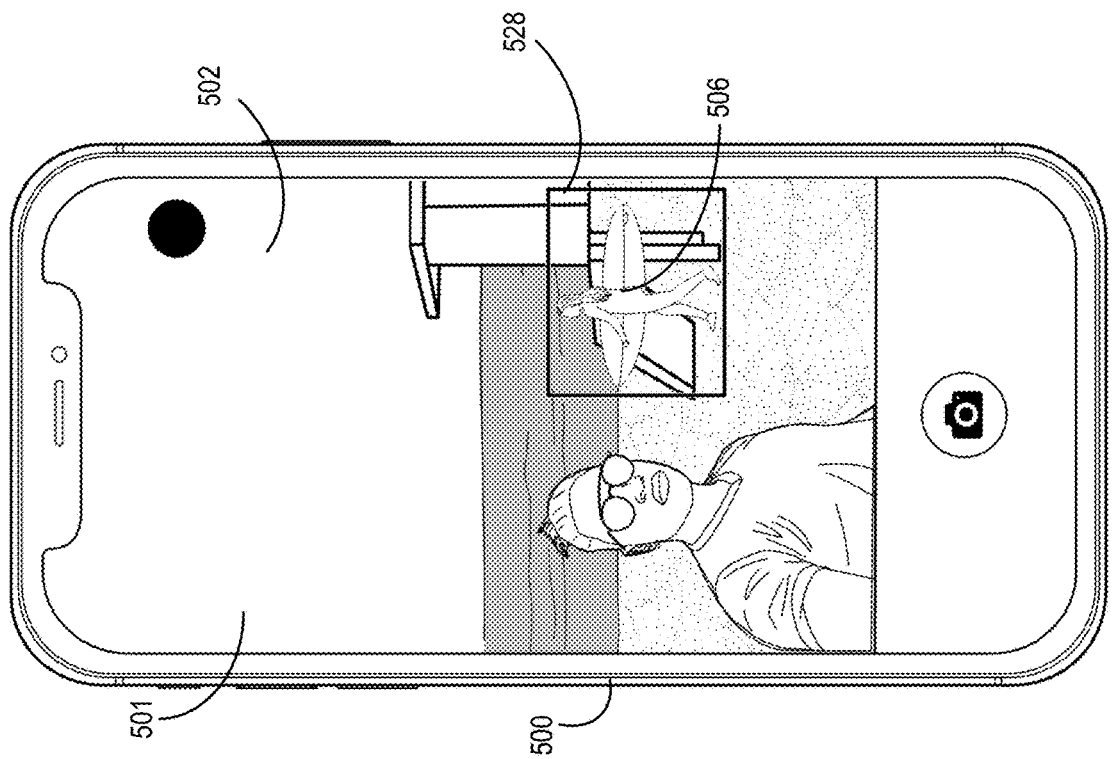

As shown in FIG. 5E, the pre-capture object removal system 108 provides the movable element 528 for display on the camera viewfinder graphical user interface 501. For example, the movable element 528 includes a movable icon. In particular, the movable element 528 includes a transparent rectangle box that a user of the client device 500 is able to translate across the camera viewfinder graphical user interface 501 while the client device 500 is capturing the image stream 502. Furthermore, in one or more implementations, the pre-capture object removal system 108 configures the movable element 528 to be configurable in size or shape. For example, the pre-capture object removal system 108 adjusts the size or shape of the movable element 528 in response to user input dragging a corner in or out.

In one or more implementations, the pre-capture object removal system 108 automatically provides the movable element 528 without a user indicating content fill insufficiency. In particular, the pre-capture object removal system 108 detects when the context of the content fill may be insufficient. Furthermore, the pre-capture object removal system 108 utilizes a machine learning model to identify frames of an image stream with limited background or foreground context and automatically provides the movable element 528. To illustrate, the pre-capture object removal system 108 deems frames of the image stream 502 where the object 504 and the background object(s) occupies a large portion of the frame as lacking background or foreground context and automatically provides the movable element 528 after generating an initial content fill. Alternatively, the pre-capture object removal system 108 utilizes a discriminator to determine whether the image frame with generated content replacing an object appears "realistic" or "fake." If the discriminator determines that the image frame appears fake, the pre-capture object removal system 108 surfaces the movable element 528 to initiate a user-assisted content fill generation process.

As mentioned above, a user of the client device 500 selects the movable element 528 and moves the movable element 528 to a desired location. For example, the user either drags the movable element 528 across the camera viewfinder graphical user interface 501, pans the camera viewfinder of the client device 500 to position the moveable element 528 over new content, or performs a combination of panning and dragging. FIG. 5F illustrates the user dragging the movable element 528 to a different location. In particular, dragging the movable element 528 includes informing the pre-capture object removal system 108 of a better content fill source location. To illustrate, a user of the client device 500 performs the act of dragging the movable element across the camera viewfinder graphical user interface 501. Accordingly, a user of the client device 500 informs the pre-capture object removal system 108 regarding the content fill with an area that provides better background or foreground context to compensate for the insufficient content fill.

As shown in FIG. 5G, a user of the client device 500 also pans the camera viewfinder of the client device 500 capture an image stream including content not in the image frame used to generate the content 522. For example, FIG. 5G shows a repositioning of the camera viewfinder of the client device 500 so as to capture an updated image stream. To illustrate, a user of the client device 500 pans the camera viewfinder to a different position of the surrounding environment, resulting in the updated image stream, and optionally drags/selects the movable element 528 to inform the content aware fill machine learning model of where to draw context for filling the hole.

In one or more implementations, the pre-capture object removal system 108 receives a final location of the movable element 528. In particular, the pre-capture object removal system 108 receives an identification of an area of the movable element 528 within the updated image stream to inform the content aware fill machine learning model. To illustrate, the pre-capture object removal system 108 receives pixel data information from the frame of the image stream where the movable element 528 location and utilizes the pixel data from the selected movable element 528 to inform the content aware fill machine learning model. Furthermore, the content aware fill machine learning model utilizes the received pixel data corresponding to the location of the movable element and generates an updated content fill 536. Alternatively, the pre-capture object removal system 108 utilizes the content (i.e., pixels) in the movable element 528 at the updated location to perform a context-aware move operation. In the pre-capture object removal system 108 moves the content in the movable element 528 at the updated location to the original position of the movable element 528 to replace the removed object. For example, in one or more implementations, the pre-capture object removal system 108 performs a context-aware move operation as described U.S. Pat. No. 9,575,641, which is hereby incorporated by reference in its entirety.

As shown in FIG. 5H, the pre-capture object removal system 108 generates updated content 536 to fill the hole corresponding to removing the removed object 506. For example, the updated content 536 in FIG. 5H shows a content fill in place of the object 506 that accurately includes both the sand, ocean, and lifeguard tower in the correct location. To illustrate, the pre-capture object removal system 108 displays on the graphical user interface of the client device 500 the updated content 536 in the image stream contemporaneously with the client device 500 capturing the image stream.

Furthermore, in one or more implementations, the client device 500 captures a digital image from the image stream. In particular, a user of the client device 500 selects a selectable image capture element 538 which captures as a digital image the current frame shown in FIG. 5H. To illustrate, in response to selecting the selectable image capture element 538, the pre-capture object removal system 108 retains the frame shown in FIG. 5H as a digital image within a gallery (e.g., gallery 232 as discussed in FIG. 2F).

Figure 6A:
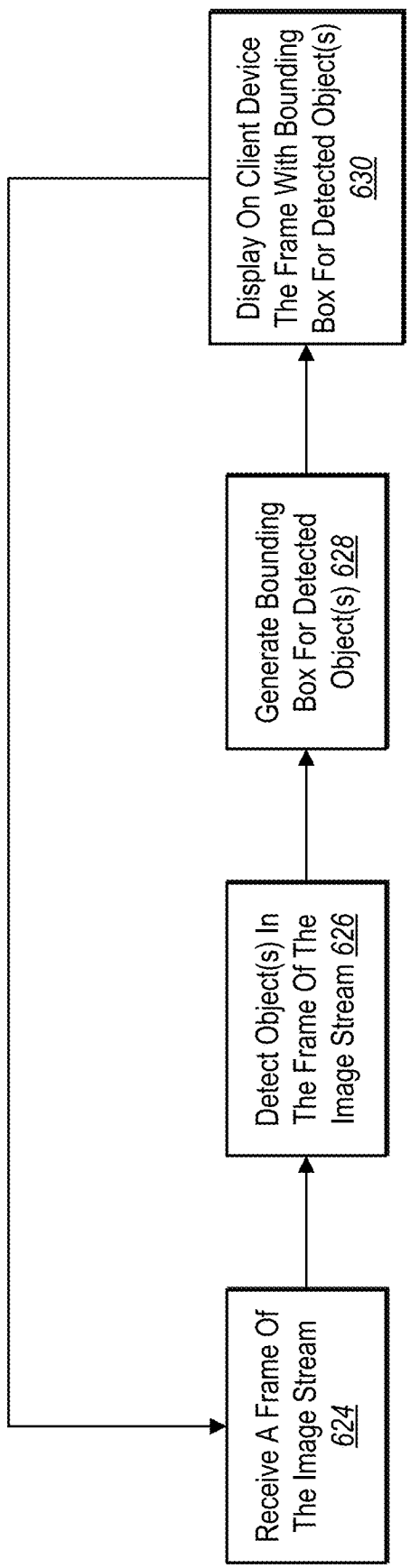
FIG. 6A-6B illustrates a block diagram of the pre-image capture object removal system generating bounding boxes for detected objects and tracking a selected object in accordance with one or more embodiments.

As discussed above, the pre-capture object removal system 108 detects objects within an image stream for each received frame of the image stream. Specifically, FIG. 6A shows a loop of the pre-capture object removal system 108 receiving a frame, detecting objects, generating bounding boxes, and displaying the detected objects on the client device. For instance, FIG. 6A shows an act 624 of receiving a frame of the image stream. For example, the act 624 of receiving the frame of the image stream includes a predetermined interval at which the client device via the camera viewfinder receives a frame. In particular, the predetermined interval includes for example, $\frac{1}{60}^{th}$ of a second. Accordingly, the client device receives 60 frames of the image stream per second (e.g., 60 fps). To illustrate, the pre-capture object removal system 108 receives each of the frames at the predetermined interval and processes the frame by utilizing object detection and object segmentation models.

As discussed, the pre-capture object removal system 108 processes each frame of the image stream received at the client device, but in one or more implementations, the pre-capture object removal system 108 receives frames but does not process every frame received. In particular, if the pre-capture object removal system 108 receives 60 frames per second, the pre-capture object removal system 108 only processes a frame for every 20 frames received. Accordingly, in one second, the pre-capture object removal system 108 processes three frames every second.

As mentioned above, the pre-capture object removal system 108 processes the frame by utilizing an object detection machine learning model. For example, as discussed previously, the pre-capture object removal system 108 performs an act 626 of detecting objects in the frame of the image stream. In particular, the pre-capture object removal system 108 processes each received frame (at predetermined intervals) and determines detected objects for each received frame. Furthermore, in addition to detecting objects within a frame of the image stream, the pre-capture object removal system 108 also generates bounding boxes.

For example, the pre-capture object removal system 108 performs an act 628 of generating bounding boxes for detected objects. In particular, based on the act 626 for detecting objects, the pre-capture object removal system 108 generates bounding boxes for each detected object for received frames processed at predetermined intervals. As illustrated by the loop arrow in FIG. 6A, the pre-capture object removal system 108 continually performs the act 628 of generating bounding boxes for detected objects for each received frame of the image stream.

As mentioned previously, the pre-capture object removal system 108 displays the bounding boxes and detected objects. For example, the pre-capture object removal system 108 performs an act 630 of displaying on a client device the frame with the bounding boxes for the detected objects. In particular, the graphical user interface of the client device shows the image stream and for each received frame that the pre-capture object removal system 108 processes, the graphical user interface displays detected objects with bounding boxes. Accordingly, the image stream continually updates with the detected objects and bounding boxes for each processed frame of the image stream. This provides a user of the client device an efficient and accurate representation of the image stream with distraction objects removed.

Figure 6B:
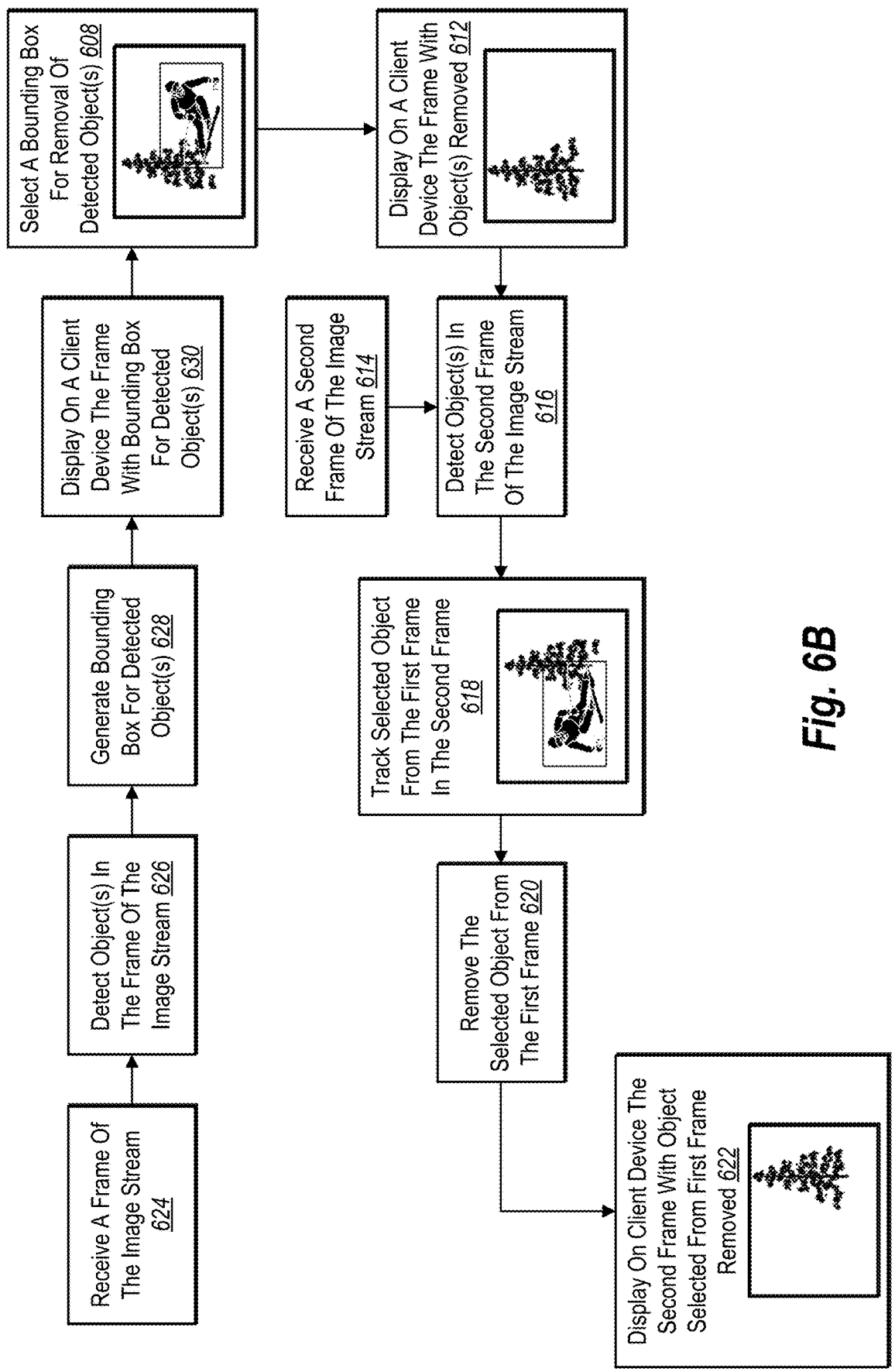

In addition to detecting objects within frames of the image stream, the pre-capture object removal system 108 also tracks detected objects within the image stream. Specifically, FIG. 6B shows a selection of a bounding box and the pre-capture object removal system 108 tracking the selected object as it receives subsequent frames of the image stream, such as the tracking discussed in U.S. Pat. No. 8,600,106 or U.S. Pat. No. 11,152,032, the entire contents of each is hereby incorporated by reference. As shown in FIG. 6B, the acts 624-630 are the same as acts 624-630 in FIG. 6A.

FIG. 6B illustrates the act 630 of displaying on the client device the frame with bounding box for the detected object. For example, in response to the act 630, FIG. 6B illustrates an act 608 for selecting a bounding box for removal of the detected object. In particular, FIG. 6B shows selection of a bounding box surrounding the skier in a frame of the image stream. To illustrate, the act 608 of selecting the bounding box sends an indication to the pre-capture object removal system 108. Furthermore, the indication includes informing the pre-capture object removal system 108 to remove the selected object within the bounding box.

As just discussed, in response to the selection, the pre-capture object removal system 108 removes the selected object. FIG. 6B in particular shows an act 612 of displaying the image stream with the object removed. To illustrate, FIG. 6B shows the act 612 of displaying on a client device the frame with the object removed. As such, a user of the client device has an accurate portrayal of the skier removed from the image stream with the image stream just showing the pine tree.

As illustrated by FIG. 6B, after displaying on the client device the frame with the object removed, the pre-capture object removal system 108 receives another frame of the image stream. For example, the pre-capture object removal system 108 performs an act 614 of receiving a second frame of the image stream. In particular, the second frame of the image stream includes a frame that differs from the first frame of the image stream. To illustrate, as shown in FIG. 6B the image stream includes a skier, which is a moving object. As such, subsequently received frames include frames where the object (skier) is not in its original position.

After receiving the second frame of the image stream, the pre-capture object removal system 108, as mentioned earlier, detects objects. For example, as illustrated in FIG. 6B, the pre-capture object removal system 108 performs an act 616 of detecting objects in the second frame of the image stream. In particular, the pre-capture object removal system 108 performs the act 616 for detecting objects but detects objects for the second frame of the image stream as opposed to the first frame of the image stream. To illustrate, if the second frame of the image stream includes any object changes, the pre-capture object removal system 108 detects the object changes.

As mentioned earlier, the pre-capture object removal system 108 tracks detected objects. For example, the pre-capture object removal system 108 performs an act 618 of tracking selected objects from the first frame to the second frame. In particular, as mentioned earlier, the pre-capture object removal system 108 receives a selection of a bounding box for removal of an object, in receiving this selection, the pre-capture object removal system 108 continues to track the selected object in subsequently received frames of the image stream. To illustrate, the skier moves to another location of the image stream, and as such in the second frame of the image stream received by the client device, the pre-capture object removal system 108 identifies the skier in an updated location.

In one or more implementations, the pre-capture object removal system 108 tracks the selected object from the first frame with a tracking system. In particular, the tracking system utilizes a similarity heuristic to determine similarity scores of pixels for objects in the frames of the image stream that indicate how similar the objects are to the selected object (the selected object from the first frame, e.g., the act 608). In one or more embodiments, the tracking system uses a spatially constrained similarity measure with a voting map-based measuring approach to identify the selected object in the subsequently received frames of the image stream, as described in greater detail below. Briefly, in one or more embodiments, the tracking system identifies, for a given frame and the selected frame, and a bounding box that surrounds an object. The bounding box (and associated object) for a given frame comprises the portion of the frame with the highest similarity score.

The tracking system determines if an object in the image stream is the selected object from the first frame based on the similarity score. For instance, the tracking system identifies an object as the selected object if the similarity score of the pixels for the selected object is within a predetermined similarity score threshold. Thus, the tracking system both identifies frames including the selected object and the location of the selected object within subsequent frames of the image stream.

As discussed above, the pre-capture object removal system 108 tracks the location of the selected object from the first frame in the second frame of the image stream. For example, the image capturing system as illustrated in FIG. 6B performs an act 620 of removing the selected object from the first frame. In particular, in applying the principles outlined in the last few paragraphs, the pre-capture object removal system 108 identifies the exact pixels of the selected object from the first frame and automatically reselects the selected object in the second frame (or any subsequent frame). Furthermore, after automatically reselecting the selected object in the second frame (and each subsequent frame), the pre-capture object removal system 108 generates an object mask for the selected object and removes the selected object from the second frame (and each subsequent frame).

As also discussed above, the pre-capture object removal system 108 displays removed objects from the image stream at the client device. For example, FIG. 6B illustrates the pre-capture object removal system 108 performing an act 622. The act 622 includes displaying on the client device the second frame with the object selected from the first frame removed. In particular, the image capturing system receives subsequent frames of the image stream and continually displays the received frames with removed objects at the client device. To illustrate, FIG. 6B shows an image stream with the skier removed.

Although FIG. 6B utilizes the principles discussed above to track selected objects, the image capturing system also utilizes the above principles for a variety of tasks. In one or more implementations, the tracking system for selected objects utilizes a list. For example, the pre-capture object removal system 108 retains a list of objects selected for removal. In particular, the list of objects includes pixel data corresponding to a bounding box and object mask of the selected object and an object label associated with the selected object. To illustrate, if the user selects the skier in FIG. 6B, the image capturing system retains a list of the pixel data corresponding with the skier, and a "skier" object label. Furthermore, as the image stream changes, the image capturing system refers to the retained list to re-remove any objects on the list from their updated locations within the image stream.

In one or more implementations, the pre-capture object removal system 108 uses the principles from FIG. 6B for managing a shaky client device. For example, in one or more implementations, a user of the client device unsteadily holds the client device resulting in previously selected objects within the image stream to move to a different location. In particular, the pre-capture object removal system 108 utilizes the object tracking system described above to locate selected objects for removal in updated locations and automatically removes those selected objects.

Figure 7:
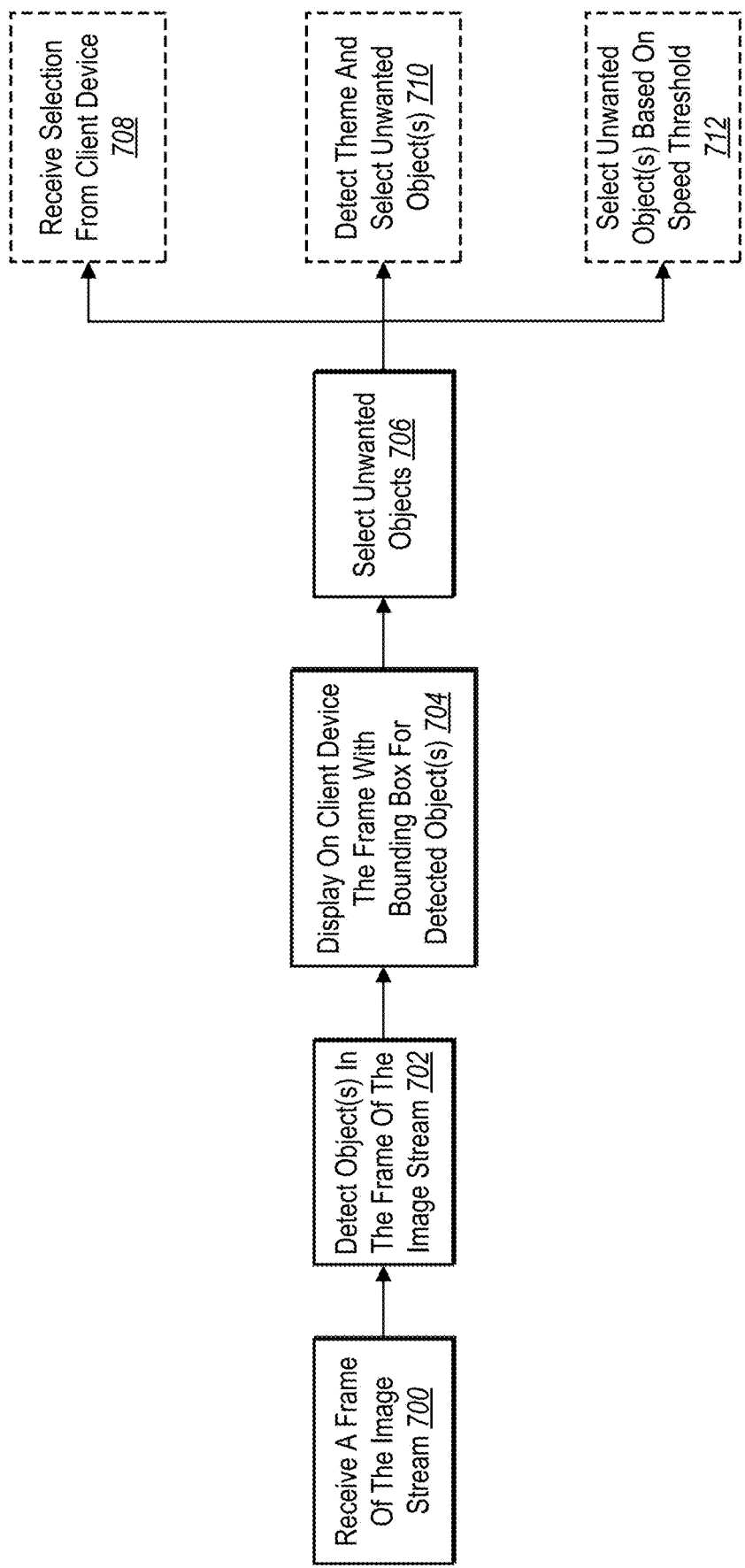
FIG. 7 illustrates a block diagram of the pre-image capture object removal system selecting unwanted object(s) in accordance with one or more embodiments.

As discussed earlier, the pre-capture object removal system 108 selects unwanted objects within an image stream. Specifically, FIG. 7 shows the pre-capture object removal system 108 detecting objects, displaying the detected objects on a client device, and selecting unwanted objects. For instance, acts 700-704 as shown in FIG. 7 are similar to the acts 624, 626, and 630 described in FIGS. 6A-6B. FIG. 7 illustrates an act 706 of the pre-capture object removal system 108 selecting unwanted objects. For example, the act 706 includes an act 708 of receiving a selection from the client device, an act 710 of detecting a theme and selecting unwanted object(s), and an act 712 of selecting unwanted object(s) based on a speed threshold. In particular, FIG. 7 shows the aforementioned acts as optional acts, as indicated by the dotted boxes. To illustrate, in one or more implementations the pre-capture object removal system 108 performs any combination of the aforementioned acts.

As mentioned above, the pre-capture object removal system 108 performs the act 708 of receiving a selection from the client device. For example, receiving a selection from the client device includes a user of the client device sending an indication of selecting one or more objects. In particular, the user of the client device selects the detected object on the graphical user interface. To illustrate, the user of the client device taps the detected objects on the graphical user interface of the client device to indicate a selection.

In addition to receiving a selection from the client device, the image capturing system performs the act 710 of detecting a theme of the image stream and selecting unwanted objects. For example, the image capturing system detects all the objects within an image stream, identifies a classification for each of the detected objects and determines an associated theme for the image stream. In particular, the pre-capture object removal system 108 tags the objects and utilizes a machine learning model to determine a theme. To illustrate, the pre-capture object removal system 108 tags the objects in the image stream "sandals," "beach ball," "volleyball net," "ocean," "towel," and "people." The machine learning model determines based on the tagged objects a theme of "beach."

Furthermore, in response to determining a theme of the image stream, the pre-capture object removal system 108 selects unwanted objects. For example, in the beach theme example given, the pre-capture object removal system 108 identifies the "towel" and "sandal" as unwanted objects. In particular, the pre-capture object removal system 108 removes the unwanted objects of towel and sandal from the image stream and fills in a hole corresponding to the unwanted objects with an appropriate content fill. Moreover, based on the theme, the pre-capture object removal system 108 utilizes machine learning models to identify unwanted objects.

In one or more implementations, the pre-capture object removal system 108 determines unwanted objects based on a primary focus of the image stream. For example, if a user of the client device taps a monument shown on the graphical user interface, this indicates to the pre-capture object removal system 108 that the selected monument is the primary focus of the image stream. In particular, the pre-capture object removal system 108 determines that other objects such as bikes or pedestrians around the monument are unwanted objects. On the contrary, if the user of the client device taps the graphical user interface corresponding to the bikes rather than the monument, than the pre-capture object removal system 108 does not determine that the bikes are unwanted objects.

In addition to selecting unwanted objects based on a determined theme of the image stream, the pre-capture object removal system 108 performs the act 712 of selecting an unwanted object based on a speed threshold. For example, the pre-capture object removal system 108 determines a speed threshold for objects within an image stream. In particular, the pre-capture object removal system 108 utilizes a speed threshold to remove objects exceeding a certain speed. Further, the pre-capture object removal system 108 utilizing a speed threshold removes distractions in the image stream that are difficult to select based on their speed.

For example, the pre-capture object removal system 108 receives an image stream with a train operating in the background. In particular, the pre-capture object removal system 108 detects that the train moves at a speed greater than the established speed threshold. To illustrate, because the train exceeds the established speed threshold, the pre-capture object removal system 108 removes the train from the image stream and displays at the client device the image stream with no train.

In one or more implementations, the pre-capture object removal system 108 provides an option for the user of the client device to select the object that exceeds a speed threshold while in other implementations the pre-capture object removal system 108 automatically removes objects that exceed a speed threshold. In particular, a user selection of an object that exceeds a speed threshold includes the user pressing and holding on the graphical user interface of the client device the area corresponding to the object that exceeds the speed threshold. Removal of objects that exceed a speed threshold occurs contemporaneously with what is being captured by a camera viewfinder of the client device.

Figure 8:
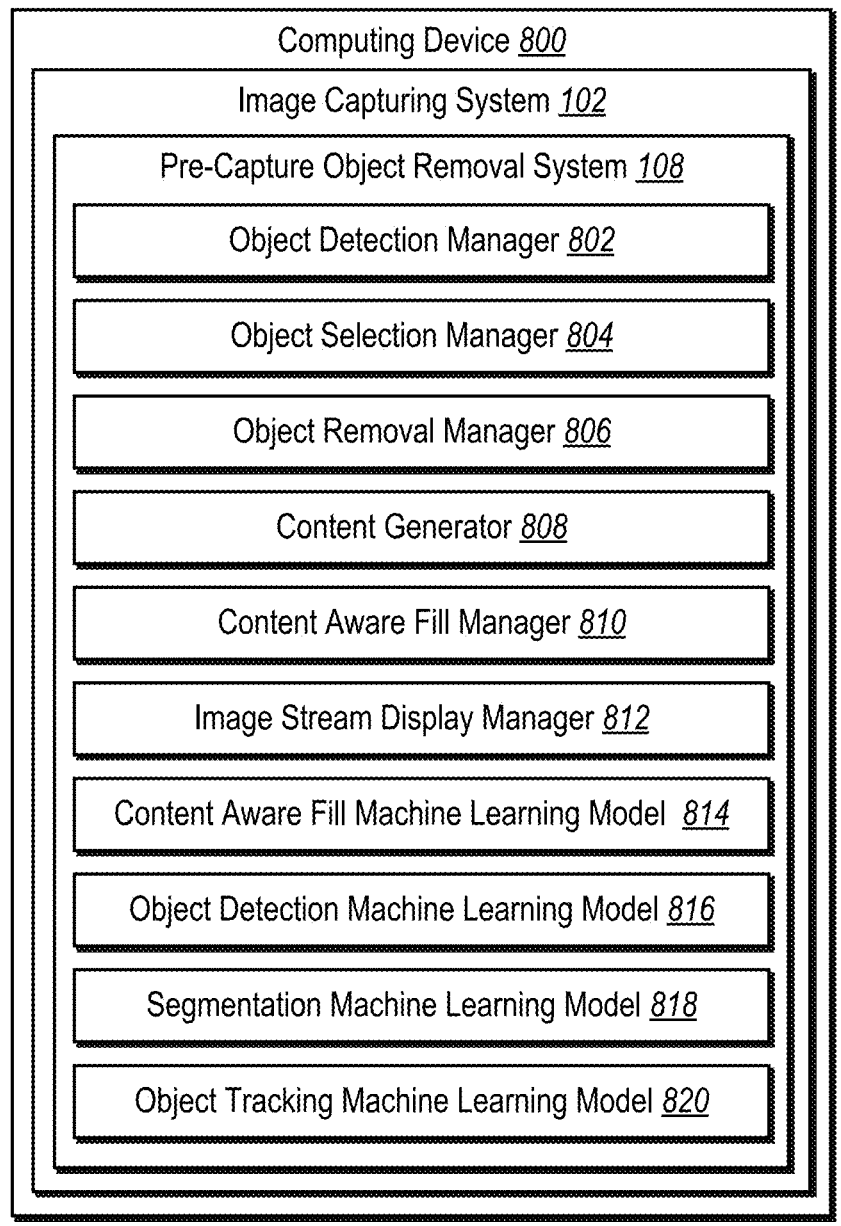
FIG. 8 illustrates a schematic diagram of an example architecture of the pre-image capture object removal system in accordance with one or more embodiments.

Referring now to FIG. 8, additional detail is provided regarding the capabilities and components of the pre-capture object removal system 108 in accordance with one or more implementations. In particular, FIG. 8 shows a schematic diagram of an example architecture of the pre-capture object removal system 108 implemented and executed on a computing device 800.

As shown, the pre-capture object removal system 108 is located on the computing device 800. In general, the computing device 800 may represent various types of client devices. For example, in some implementations, the client is a mobile device, such as a laptop, a tablet, a mobile telephone, a smartphone, etc. In other implementations, the computing device 800 is a non-mobile device, such as a desktop or server, or another type of client device. Additional details with regard to the computing device 800 are discussed below as well as with respect to FIG. 12.

As illustrated in FIG. 8, the pre-capture object removal system 108 includes various components for performing the processes and features described herein. For example, the pre-capture object removal system 108, an object detection manager 802, an object selection manager 804, an object removal manager 806, a content generator 808, a content fill manager 810, an image stream display manager 812, a content fill machine learning model 814, an object detection machine learning model 816, a segmentation machine learning model 818, and an object tracking machine learning model 820. Each of the components mentioned above is described below in turn.

The pre-capture object removal system 108 implements the pre-capture object removal system 108 to perform a variety of detection, selection, removal, and generation tasks. The object detection manager 802 detects objects via the object detection machine learning model 816 within an image stream being captured by the computing device 800. Furthermore, the pre-capture object removal system 108 via the segmentation machine learning model 818 segments detected objects and generates object masks.

The object selection manager 804 oversees selection of detected objects while the object removal manager 806 oversees removing selected objects. In one or more examples, the object selection manager 804 utilizes the object tracking machine learning model 820 to track selected objects. Also, the pre-capture object removal system 108 via the pre-capture object removal system 108 then fills holes left by the removed objects with the content generator 808, the content fill manager 810 and the content fill machine learning model 814. After removing and filling holes left by the removed objects, the image stream display manager 812 oversees displaying the image stream with the removed objects to the computing device 800.

Each of the components of the pre-capture object removal system 108 optionally includes software, hardware, or both. For example, the components optionally include one or more instructions stored on a computer-readable storage medium and executable by processors of one or more computing devices, such as a client device (e.g., a mobile client device) or server device. When executed by the one or more processors, the computer-executable instructions of the pre-capture object removal system 108 causes a computing device to capture an image stream and detect objects as described herein. Alternatively, the components optionally include hardware, such as a special-purpose processing device to perform a certain function or group of functions. In addition, the components of the pre-capture object removal system 108 optionally includes a combination of computer-executable instructions and hardware.

Furthermore, the components of the pre-capture object removal system 108 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE CAPTURE, LIGHTROOM MOBILE, PHOTOSHOP CAMERA, PHOTOSHOP MOBILE, or other digital content applications software packages. The foregoing are either registered trademarks or trademarks of Adobe Inc. in the United States and/or other countries.

Figure 9:
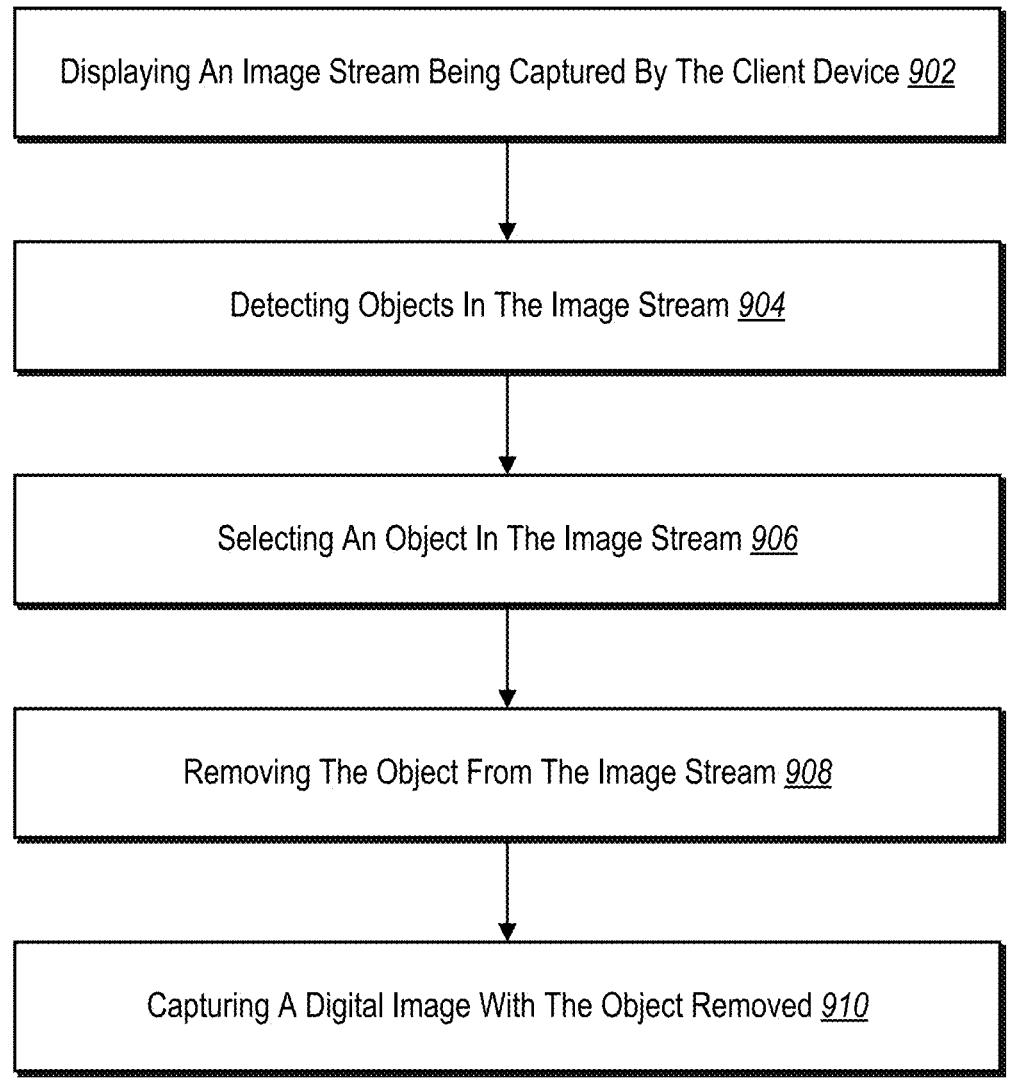
FIG. 9 illustrates an example series of acts for removing an object in an image stream in accordance with one or more embodiments.

FIGS. 1-8, the corresponding text, and the examples provide a number of different methods, systems, devices, and non-transitory computer-readable media of the pre-capture object removal system 108. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for detecting, selecting, removing, and capturing a digital image with an object removed in accordance with one or more embodiments. The series of acts 900 include an act 902 of displaying an image stream being captured by the client device. For example, the act 902 includes displaying, in a graphical user interface at a client device, an image stream being captured by the client device.

As shown, the series of acts 900 also includes an act 904 of detecting objects in the image stream. For example, the act 904 includes detecting one or more objects in the image stream. Further the act 904 also includes utilizing an object detection machine learning model to detect the one or more objects in frames of the image stream and optionally assigning an object label to each of the one or more objects.

As shown, the series of acts 900 includes an act 906 of selecting an object in the image stream. For example, the act 906 includes selecting an object of the one or more objects in the image stream. The act 906 includes determining a theme of the image stream based on object labels of the one or more objects in the image stream and selecting the object as unwanted based on the determined theme of the image stream and an object label of the object. Furthermore, the act 906 includes providing a selectable element in connection with display of the object in the image stream and receiving a selection of the selectable element.

As also shown, the series of acts 900 include an act 908 of removing the object from the image stream. As shown, the series of acts 900 include an act 910 of capturing a digital image with the object removed. For example, the act 910 includes capturing a digital image from the image stream with the object removed.

The series of acts 900 also optionally includes generating, utilizing a segmentation machine learning model, an object mask for the object. Further, this includes tracking a location of the object in the frames of the image stream, removing the object from each of the frames of the image stream based on the tracking of the object, and displaying the image stream, in the graphical user interface, with the object removed.

Additionally, the acts 900 include generating, by a content aware fill machine learning model, content to fill a hole created by removal of the object and filling the hole in the image stream with the content. The acts 900 also include receiving, prior to capturing the digital image, an indication from the client device that the content used to fill the hole is insufficient. The acts 900 also involve receiving, prior to capturing the digital image, an identification of an area of the image stream to inform the content aware fill machine learning model. The acts 900 also include generating, by the content aware fill machine learning model, updated content to fill the hole based on the area of the image stream. Furthermore, the acts 900 include filling the hole in the image stream with the updated content.

Furthermore, the acts 900 optionally also include providing a selectable icon in the graphical user interface and receiving a selection of the selectable icon. In response, the acts 900 include displaying a movable element in response to the selection of the selectable icon. The acts 900 involve receiving the identification of the area of the image stream by detecting a location of the movable element. Additionally, the acts 900 include detecting the location of the movable element comprises determining that the movable element is located on a portion of an updated image stream being captured in response to panning the client device.

While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

Figure 10:
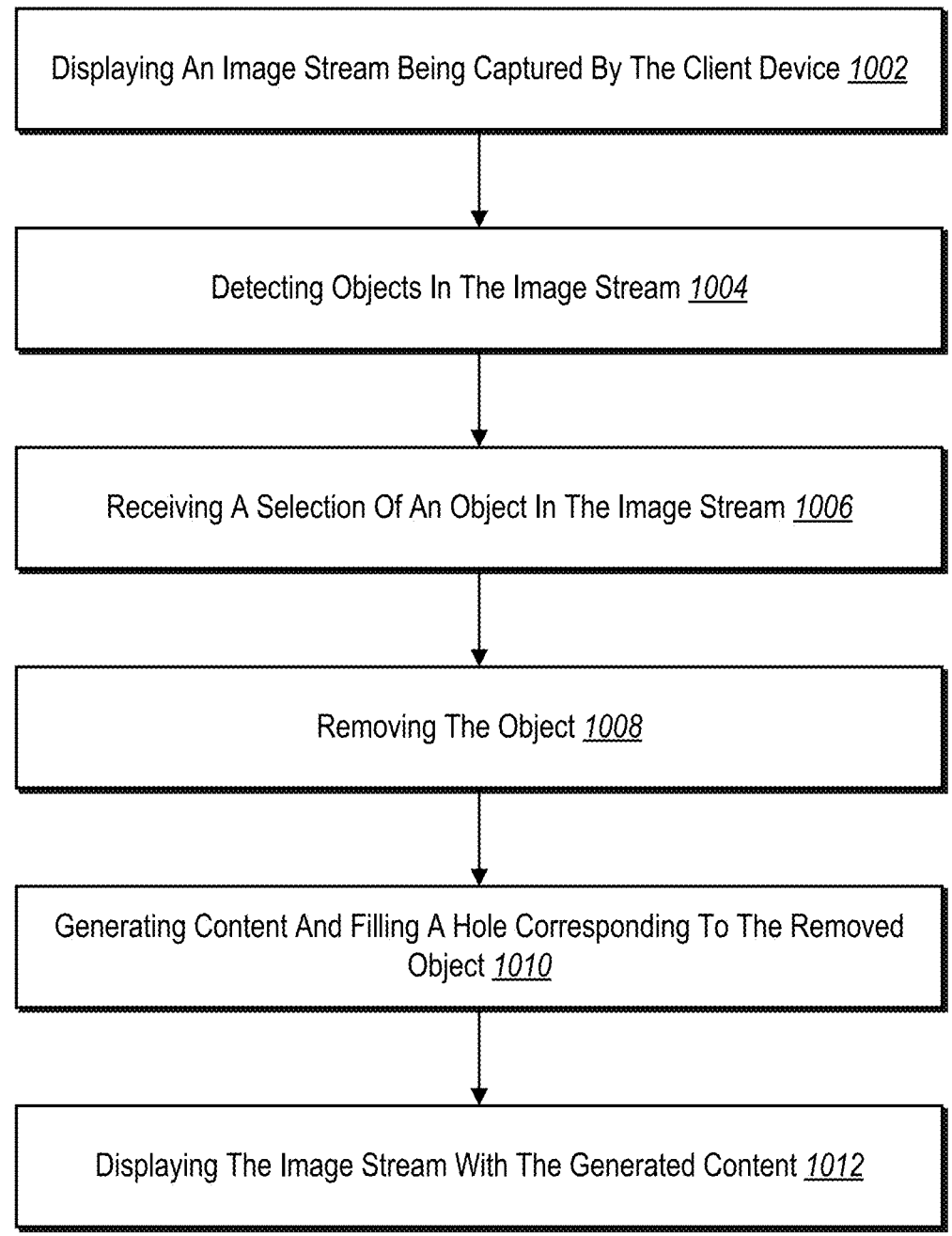
FIG. 10 illustrates an example series of acts for removing an object and filing a hole for the removed object an image stream with content in accordance with one or more embodiments.

In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for detecting, selecting, removing, generating, and capturing a digital image in accordance with one or more embodiments. The series of acts 1000 includes an act 1002 of displaying an image stream being captured by the client device. For example, the act 1002 includes displaying, in a graphical user interface at a client device, an image stream being captured by the client device. In addition, the series of acts 1000 includes an act 1004 of detecting objects in the image stream. For example, the act 1004 includes detecting one or more objects in the image stream. Further, the act 1004 also includes detecting the one or more objects in a sequence of frames of the image stream utilizing an object detection neural network.

The series of acts 1000 also include an act 1006 of receiving a selection of an object in the image stream. For example, the act 1006 includes receiving a selection of an object of the one or more objects in the image stream. Further, the act 1006 includes receiving the selection comprises determining an object speed threshold. The series of acts 1000 also includes an act 1008 of removing the object. For example, the act 1008 includes removing the object in response to the selection. The act 1008 also includes removing a moving object from the image stream when the moving object exceeds the object speed threshold.

The series of acts 1000 also includes an act 1010 of generating content and filling a hole corresponding to the removed object. For example, the act 1010 includes generating content and filling a hole corresponding to the removed object in the image stream with the content. Further, the act 1010 includes determining a location of the movable icon and utilizing a content aware fill neural network to generate updated content based on the selected content within the movable icon.

The series of acts 1000 also includes an act 1012 of displaying the image stream with the generated content. For example, the act 1012 includes displaying the image stream with the content in place of the removed object in the graphical user interface. In addition to the series of acts 1000, the series of acts 1000 also includes capturing a digital image from the image stream with the object removed. The series of acts 1000 also includes removing a second object of the one or more objects in response to a second selection. The series of acts 1000 also includes retaining a list of removed objects including the object and the second object removed. The series of acts 1000 also includes, as the image stream changes, determining updated locations of objects in the list of removed objects, and removing the objects in the list of the removed objects from the updated locations from the image stream. Furthermore, the series of acts 1000 includes providing a selectable icon for client device assisted content generation. The series of acts 1000 also includes receiving a selection of the selectable icon. In response to receiving the selection, the series of acts 1000 includes providing a movable icon to indicate a selected content to use to fill the hole.

While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

Figure 11:
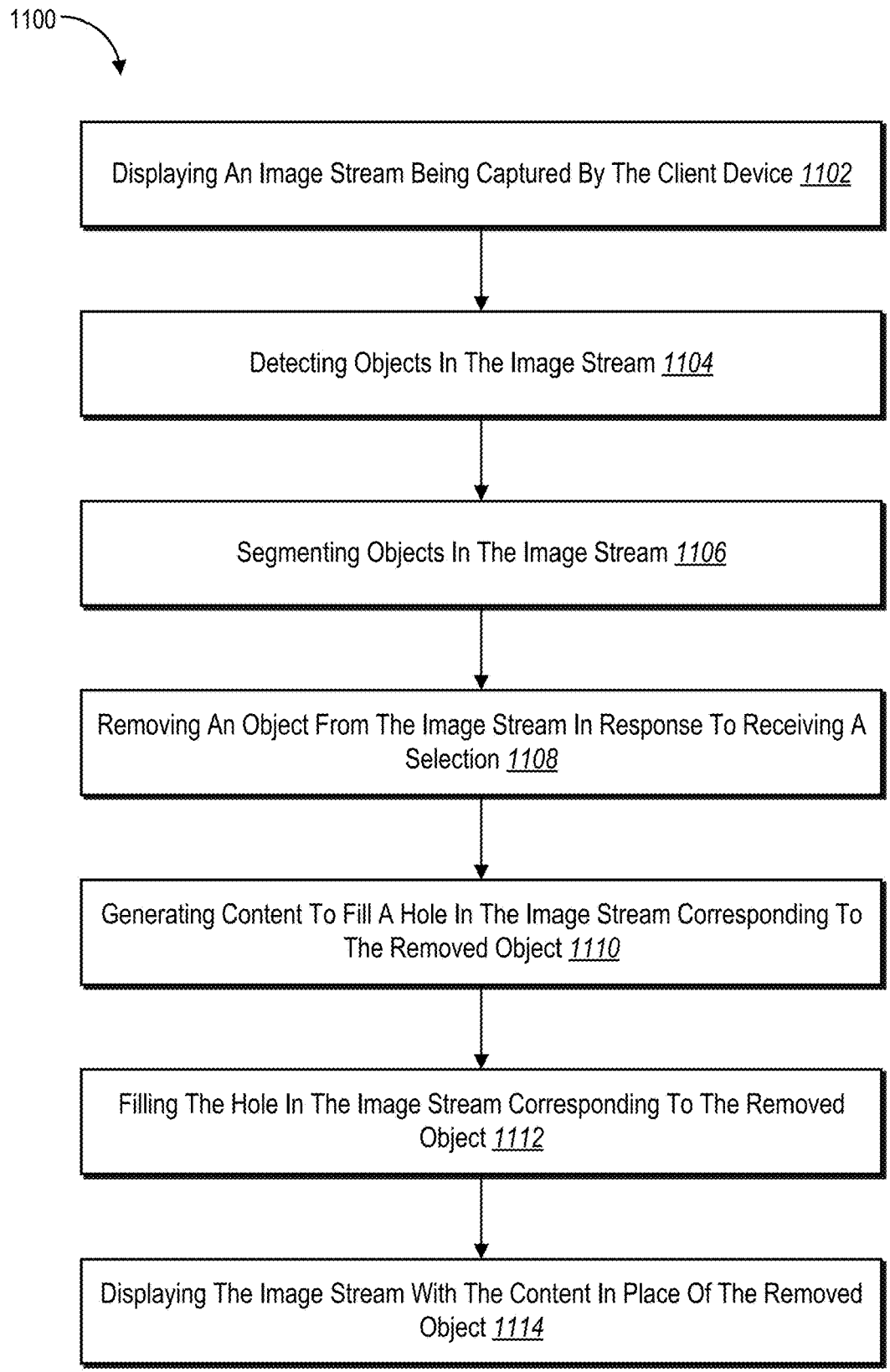
FIG. 11 illustrates an example series of acts for removing an object prior to capturing an image stream in accordance with one or more embodiments.

In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for detecting, selecting, removing, generating, and capturing a digital image in accordance with one or more embodiments. The series of acts 1100 includes an act 1102 of displaying an image stream being captured by the client device. For example, the act 1102 includes displaying, in a graphical user interface at a client device, an image stream being captured by the client device. The series of acts 1100 also includes an act 1104 of detecting objects in the image stream. For example, the act 1104 includes detecting, utilizing an object detection artificial intelligence model, one or more objects in the image stream.

In addition, the series of acts 1100 also includes an act 1106 of segmenting objects in the image stream. For example, the act 1106 includes segmenting, utilizing a segmentation artificial intelligence model, the one or more objects in the image stream. The series of acts 1100 also includes an act 1108 of removing an object from the image stream in response to receiving a selection. For example, the act 1108 includes removing an object of the one or more objects from the image stream in response to receiving a selection of the object.

Furthermore, the series of acts 1100 includes an act 1110 of generating content to fill a hole in the image stream corresponding to the removed object. For example, the act 1110 includes generating content to fill a hole in the image stream corresponding to the removed object utilizing a content aware fill machine learning model. The series of acts 1100 also includes an act 1112 of filling the hole in the image stream corresponding to the removed object. For example, the act 1112 includes filling the hole in the image stream corresponding to the removed object with the content. Moreover, the series of acts 1100 also includes an act 1114 of displaying the image stream with the content in place of the removed object. For example, the act 1114 includes displaying the image stream with the content in place of the removed object in the graphical user interface of the client device.

In addition to the series of acts 1100, the series of acts 1100 also includes capturing a digital image from the image stream with the content in place of the removed object; and displaying the image stream, prior to capturing of the digital image, with the object removed and generated content in place of the object as the image stream changes over time or in response to movement of the client device capturing the image stream.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media is any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which stores desired program code in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links for carrying desired program code in the form of computer-executable instructions or data structures and which is accessible by a general-purpose or special-purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) optionally is included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure optionally are implemented in cloud computing environments. As used herein, the term "cloud computing" refers to a model for enabling on-demand network access to a shared pool of configurable computing resources. For example, cloud computing optionally is utilized in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model optionally is composed of various characteristics such as, for example, on-demand self-service, broad network access, resource pooling, rapid elasticity, measured service, and so forth. A cloud-computing model optionally implements various service models, such as, for example, Software as a Service ("SaaS"), Platform as a Service ("PaaS"), and Infrastructure as a Service ("IaaS"). A cloud-computing model is deployable using different deployment models such as private cloud, community cloud, public cloud, hybrid cloud, and so forth. In addition, as used herein, the term "cloud-computing environment" refers to an environment in which cloud computing is utilized.

FIG. 12 illustrates a block diagram of an example computing device 1200 that may be configured to perform one or more of the processes described above. One will appreciate that one or more computing devices, such as the computing device 1200 may represent the computing devices described above (e.g., computing device 800, server device(s) 106 and client devices 104). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders.

Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    displaying, in a camera viewfinder graphical user interface at a client device, a live image stream from a camera of the client device;
    detecting a plurality of objects in the live image stream;
    selecting an object of the plurality of objects in the live image stream;
    removing the object from the live image stream;
    displaying, in the camera viewfinder graphical user interface at the client device, the live image stream with the object removed despite the camera capturing the object in the live image stream; and after removing the object from the live image stream, capturing by the client device a digital image from the live image stream with the object removed.

2. The computer-implemented method of claim 1, wherein detecting the plurality of objects further comprises utilizing an object detection machine learning model to detect the plurality of objects in frames of the live image stream and assign an object label to each of the plurality of objects.

3. The computer-implemented method of claim 2, further comprising generating, utilizing a segmentation machine learning model, an object mask for the object.

4. The computer-implemented method of claim 3, further comprising:
tracking a location of the object in the frames of the live image stream;
removing the object from each of the frames of the live image stream based on the tracking of the object; and
displaying the live image stream, in the camera viewfinder graphical user interface, with the object removed.

5. The computer-implemented method of claim 2, wherein selecting the object of the plurality of objects in the live image stream comprises:
determining a theme of the live image stream based on object labels of the plurality of objects in the live image stream; and
selecting the object as unwanted based on the determined theme of the live image stream and the object label of the object.

6. The computer-implemented method of claim 1, wherein selecting the object further comprises:
providing a selectable element in connection with display of the object in the live image stream; and
receiving a selection of the selectable element.

7. The computer-implemented method of claim 1, further comprising:
generating by a content aware fill machine learning model, content to fill a hole created by removal of the object; and
filling, the hole in the live image stream with the content.

8. The computer-implemented method of claim 7, further comprising:
receiving, prior to capturing the digital image, an indication from the client device that the content used to fill the hole is insufficient;
receiving, prior to capturing the digital image, an identification of an area of the live image stream to inform the content aware fill machine learning model;
generating, by the content aware fill machine learning model, updated content to fill the hole based on the area of the live image stream; and
filling the hole in the live image stream with the updated content.

9. The computer-implemented method of claim 8, wherein receiving the indication from the client device further comprises:
providing a selectable icon in the camera viewfinder graphical user interface; and
receiving a selection of the selectable icon.

10. The computer-implemented method of claim 9, further comprising:
providing and displaying a movable element in response to the selection of the selectable icon; and
receiving the identification of the area of the live image stream by detecting a location of the movable element.

11. The computer-implemented method of claim 10, wherein receiving the identification of the area of the live image stream by detecting the location of the movable element comprises determining that the movable element is located on a portion of an updated live image stream being captured in response to panning the client device.

12. A non-transitory computer-readable medium comprising instructions that, when executed by at least one processor, cause the at least one processor to perform operations comprising:
displaying in a camera viewfinder graphical user interface, at a client device, a live image stream from a camera of the client device;
detecting a plurality of objects in the live image stream;
receiving, via the camera viewfinder graphical user interface, a selection of an object of the plurality of objects in the live image stream;
removing the object in response to the selection;
generating content and filling a hole corresponding to the removed object in the live image stream with the content; and
displaying the live image stream with the content in place of the removed object in the camera viewfinder graphical user interface despite the camera capturing the object in the live image stream.

13. The non-transitory computer-readable medium of claim 12, wherein the operations further comprise capturing a digital image from the live image stream with the object removed.

14. The non-transitory computer-readable medium of claim 12, wherein the operations further comprise:
removing a second object of the plurality of objects in response to a second selection;
retaining a list of removed objects including the object and the second object removed;
as the live image stream changes determining updated locations of objects in the list of removed objects; and
removing the objects in the list of the removed objects from the updated locations from the live image stream.

15. The non-transitory computer-readable medium of claim 12, wherein the operations further comprise:
providing a selectable icon for client device assisted content generation;
receiving a selection of the selectable icon; and
in response to receiving the selection, providing a movable icon to indicate a selected content to use to fill the hole.

16. The non-transitory computer-readable medium of claim 15, wherein generating the content comprises:
determining a location of the movable icon; and
utilizing a content aware fill neural network to generate updated content based on the selected content within the movable icon.

17. The non-transitory computer-readable medium of claim 12, wherein:
detecting comprises detecting the plurality of objects in a sequence of frames of the live image stream utilizing an object detection neural network;
receiving the selection comprises determining an object speed threshold; and
removing comprises removing a moving object from the live image stream when the moving object exceeds the object speed threshold.

18. A system comprising:
at least one memory device; and
at least one processor configured to cause the system to perform operations comprising:

displaying in a camera viewfinder graphical user interface, at a client device, a live image stream from a camera of the client device;
detecting, utilizing an object detection artificial intelligence model, a plurality of objects in the live image stream;
segmenting, utilizing a segmentation artificial intelligence model, the plurality of objects in the live image stream;
receiving, via the camera viewfinder graphical user interface, a user selection of one of the plurality of objects segmented within the live image stream;
removing the object of the plurality of objects from the live image stream in response to receiving the user selection of the object;
generating content to fill a hole in the live image stream corresponding to the removed object utilizing a content aware fill machine learning model;
filling the hole in the live image stream corresponding to the removed object with the content; and
displaying the live image stream with the content in place of the removed object in the camera viewfinder graphical user interface of the client device despite the camera capturing the object in the live image stream.

19. The system of claim 18, further comprising instructions that, when executed by the at least one processor configured to cause the system to capture a digital image from the live image stream with the content in place of the removed object.

20. The system of claim 19, further comprising instructions that, when executed by the at least one processor configured to cause the system to display the live image stream, prior to capturing of the digital image, with the object removed and generated content in place of the object as the live image stream changes over time or in response to movement of the client device capturing the live image stream.

* * * * *